(12) United States Patent
Aoka et al.

(10) Patent No.: US 7,498,525 B2
(45) Date of Patent: Mar. 3, 2009

(54) CARD TYPE PERIPHERAL APPARATUS

(75) Inventors: Yoshitaka Aoka, Kanagawa (JP); Keiichi Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/222,122

(22) Filed: Sep. 8, 2005

(65) Prior Publication Data

US 2006/0205255 A1    Sep. 14, 2006

(30) Foreign Application Priority Data

Sep. 30, 2004    (JP)    ............................ 2004-288481

(51) Int. Cl.
*H05K 7/02*    (2006.01)

(52) U.S. Cl. .................. 174/541; 174/560; 361/737

(58) Field of Classification Search ................ 174/563, 174/50, 250, 260, 254, 69, 53, 70 R, 73.1, 174/74 R, 520, 535, 559, 560, 561, 59, 541; 439/630, 607, 159, 988; 361/737, 683, 724, 361/752

See application file for complete search history.

(56) References Cited

U.S. PATENT DOCUMENTS

| 6,139,338 | A  | * | 10/2000 | Hirai et al. | ................ | 439/141 |
| 6,574,112 | B2 | * | 6/2003 | Washino et al. | ............. | 361/752 |
| 6,853,550 | B2 | * | 2/2005 | Tseng et al. | ................ | 361/685 |
| 7,006,350 | B2 | * | 2/2006 | Bhogal | ...................... | 361/683 |
| 2006/0028803 | A1 | * | 2/2006 | Pocrass | ...................... | 361/737 |

* cited by examiner

*Primary Examiner*—Hung V Ngo
(74) *Attorney, Agent, or Firm*—Robert J. Depke; Rockey, Depke & Lyons, LLC

(57) ABSTRACT

A card type peripheral apparatus is disclosed which can be removably inserted not only into a slot of an electronic apparatus of a small size but also into a slot of an external apparatus readily and with certainty. The apparatus includes a first case, an electronic part accommodated in the first case, and a connector provided at a first end in the lengthwise direction of the first case for electrically connecting an external apparatus to the electronic part. The attachment includes a second case. Mounting portions are provided at a second end in the lengthwise direction of the first case and a first end in the lengthwise direction of the second case such that the first and second cases are removably attached to each other at the mounting portions thereof while the lengthwise directions thereof are juxtaposed with each other.

14 Claims, 19 Drawing Sheets

CARD TYPE PERIPHERAL APPARATUS

The present application claims priority to Japanese Patent Application 2004-288481, filed in the Japanese Patent Office Sep. 30, 2004; the entire contents of which is incorporated herein by reference.

CROSS REFERANCES TO RELATED APPLICATIONS

The present invention contains subject matter related to Japanese Patent Application P2004-288481 field in the Japanese Patent Office on Sep. 30, 2004, the entire contents of which being incorporated herein by reference.

BACKGROUND OF THE INVENTION

This invention relates to a card type peripheral apparatus.

Conventionally, a card type peripheral apparatus called PC card which is inserted into a card slot of a personal computer or the like is used.

In recent years, together with downsizing and processing of an increased speed of a personal computer, an Express Card (old name: NEWCARD) has been proposed as a card type peripheral apparatus having an outside size smaller than that of the PC card and capable of implementing high-speed transfer of data (refer to, for example, "To downsize and speed up the PC card: the new standards "NEWCARD" support the evolution of personal computers", NIKKEI Electronics, Jun. 9, 2003, pp. 67-76: hereinafter referred to as Non-Patent Document 1).

Where an external equipment which has a card slot into which the Express Card is to be inserted and removed is a small electronic equipment such as, for example, a portable telephone set, a digital still camera or the like, although the outside size of the Express Card is smaller than that of the PC card, the Express Card still has a length of 75 mm, a width of 34 mm and a thickness of 5 mm. Therefore, the Express Card has a disadvantage in loading into a small electronic equipment.

Therefore, a new card type peripheral apparatus is demanded which has an outside size smaller than that of the Express Card and can be inserted into a slot for the Express Card.

Further, such a small card type peripheral apparatus as described above is sometimes inserted not only into such a small electronic equipment as described above but also into a slot of and used with a comparatively large external equipment such as a personal computer. Therefore, it is significant that such a small card type peripheral apparatus as described above can be removably loaded readily and with certainty into a slot provided in a small electronic equipment as well as into a slot of an external equipment.

SUMMARY OF THE INVENTION

It is a desire of the present invention to provide a card type peripheral apparatus which can be removably inserted not only into a slot of an electronic apparatus of a small size but also into a slot of an external apparatus readily and with certainty.

According to the present invention, the desire described above is achieved by a mounting portion provided at an end of a first case in its lengthwise direction such that an attachment can be removably attached to the mounting portion.

In particular, according to an embodiment of the present invention, there is provided a card type peripheral apparatus including a first case having a width, a length and a thickness, an electronic part accommodated in the first case, and a connector provided at a first end in a lengthwise direction of the first case for electrically connecting an external equipment and the electronic part to each other, the first case having, at a second end thereof in the lengthwise direction opposite to the first end, a mounting portion to which an attachment including a second case having a length can be removably attached.

According to another embodiment of the present invention, there is provided a card type peripheral apparatus including a first case having a width, a length and a thickness, an electronic part accommodated in the first case, a connector provided at a first end in a lengthwise direction of the first case for electrically connecting an external equipment and the electronic part to each other, and an attachment including a second case having a length, the first case having a mounting portion provided at a second end thereof opposite to the first end while the second case has another mounting portion provided at a first end thereof in the lengthwise direction such that the first and second cases can be removably attached to the mounting portions in a state wherein the lengthwise directions of the first and second cases are juxtaposed with each other.

According to a further embodiment of the present invention, there is provided a card type peripheral apparatus including a first case having a width, a length and a thickness, an electronic part accommodated in the first case, and a connector provided at a first end in a lengthwise direction of the first case for electrically connecting an external equipment and the electronic part to each other, the first case having a projection provided at a second end in a lengthwise direction thereof opposite to the first end in such a manner as to project from the surface of the first case.

With any of the card type peripheral apparatus, since the first and second cases are removably attached to each other through the mounting portions thereof, the card type peripheral apparatus can be loaded into a slot provided in and used with an electronic apparatus of a small size such as a portable telephone set. Further, where the attachment is attached to the card type peripheral apparatus, the card type peripheral apparatus can be removably inserted readily and with certainty into a slot provided in an external apparatus such as a personal computer and having a depth of a dimension greater than the length of the first case.

The above and other desires, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

First Embodiment

A card type peripheral apparatus according to a first embodiment of the present invention is described first.

It is to be noted that, in the following description, the card type peripheral apparatus is formed as a memory card.

Figure 4A:
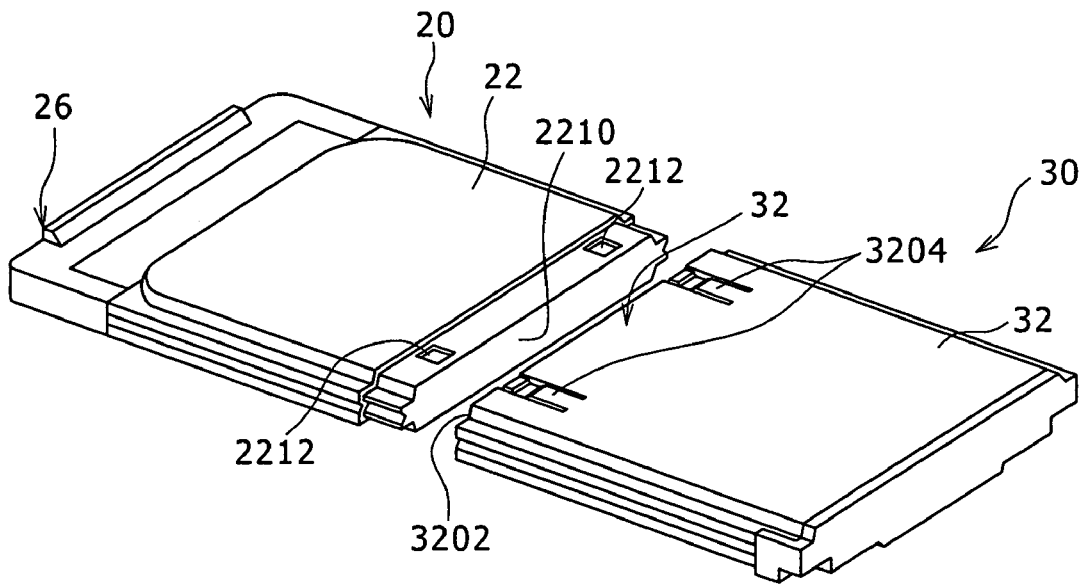
FIG. 4A is a perspective view showing the memory card of FIGS. 2A to 2C separated from a second case and FIG. 4B is a perspective view showing the memory card and the second case attached to each other.
Figure 4B:
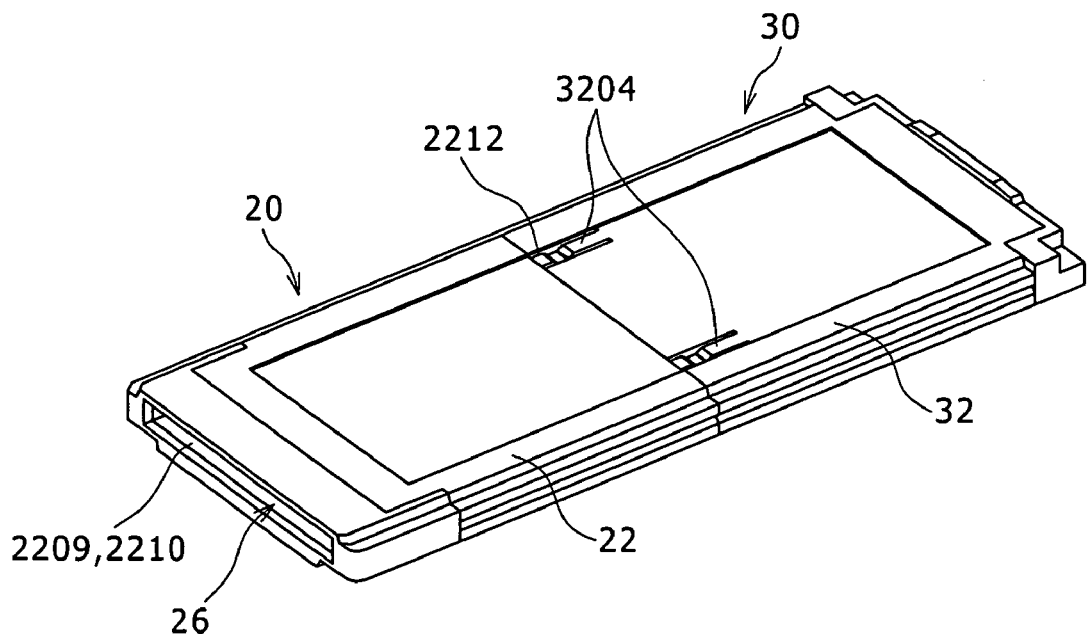

The memory card according to the present embodiment includes an attachment 30 as seen in FIGS. 4A and 4B.

Figure 3:
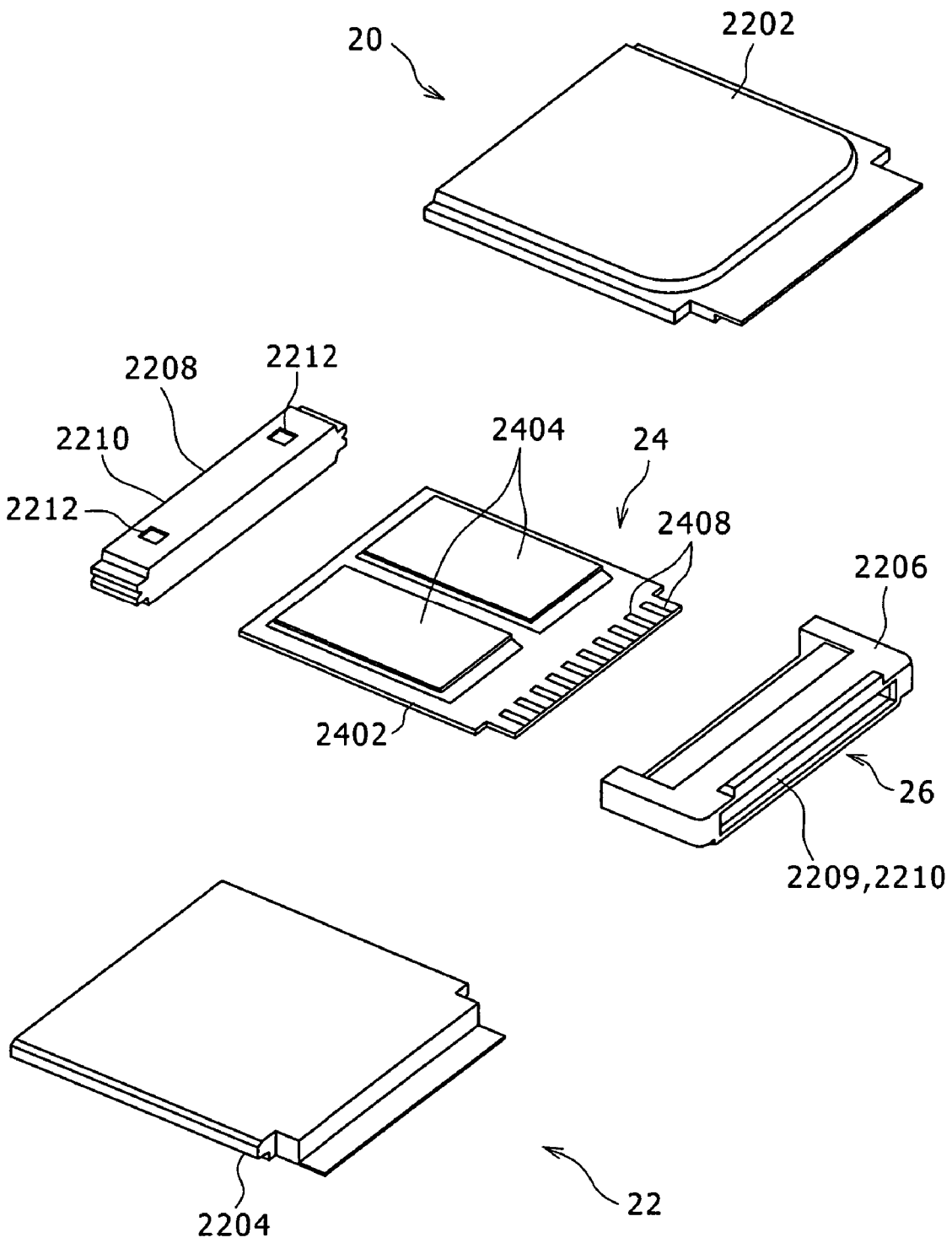
FIG. 3 is an exploded perspective view of the memory card of FIGS. 2A to 2C.

The memory card is shown in FIG. 3. Referring to FIG. 3, the memory card is denoted by reference numeral 20 and includes a first case 22 having a length in the forward and backward direction, a width in the leftward and rightward direction of a dimension smaller than the length, and a thickness in the upward and downward direction of a dimension smaller than the width. The memory card 20 further includes an electronic part 24 accommodated in the first case 22, and a connector 26 provided at a trailing or front end (one or first end in the lengthwise direction) of the first case 22 for electrically connecting an external apparatus and the electronic part 24 to each other.

The width and the thickness of the first case 22 have dimensions equal to those of the width and the thickness of an Express Card 10.

Referring to FIGS. 1(A) to 1(D), the Express Card 10 has includes a case 12 having a length in the forward and backward direction, a width in the leftward and rightward direction of a dimension smaller than that of the length, and a thickness in the upward and downward direction of a dimension smaller than that of the width. More particularly, the Express Card 10 has a length of 75 mm, a width of 34 mm and a thickness of 5 mm. Accordingly, the width of the first case 22 is 34 mm, and the thickness of the first case 22 is 5 mm. A connector 14 is provided at the leading end of the case 12.

Referring back to FIG. 3, the connector 26 has a structure same as that of the connector 14 and consequently can be inserted into and removed from a connector for the Express Card of an external apparatus such as a personal computer.

Figure 1:
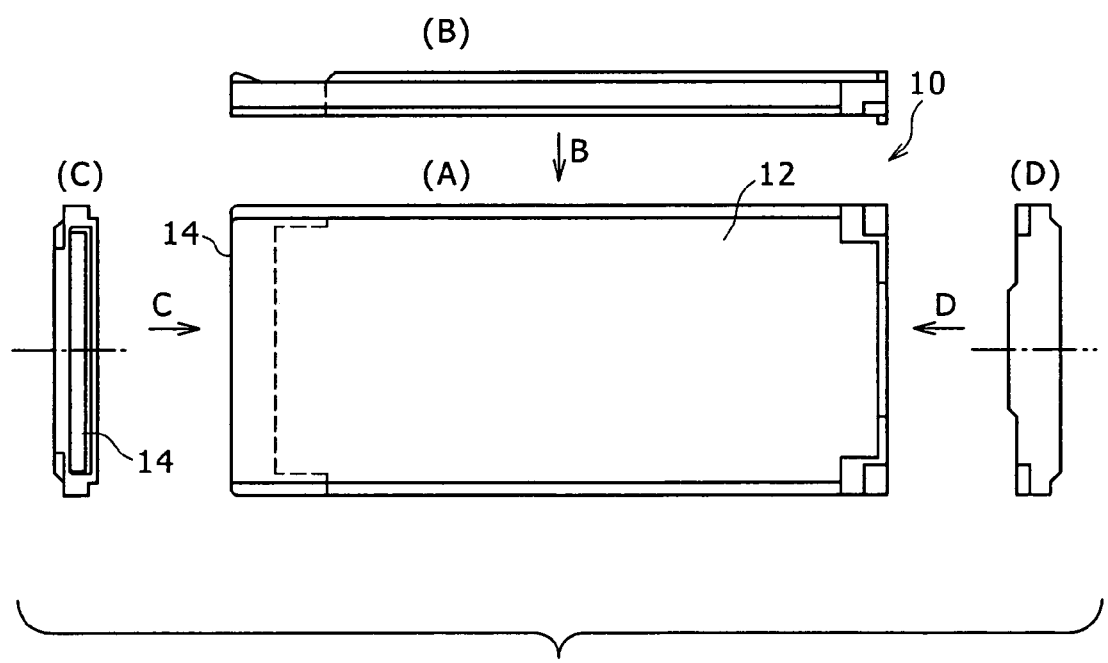
FIG. 1(A) is a top plan view of an Express card.
FIGS. 1(B), 1(C) and 1(D) are views as viewed in the directions indicated by arrow marks B, C and D in FIG. 1(A), respectively.
Figure 2A:
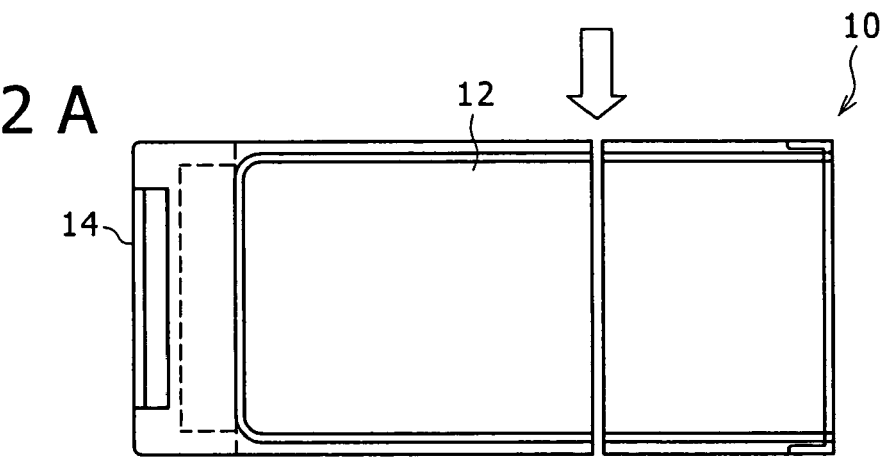
FIGS. 2A to 2C are views schematic illustrating relationships between the Express Card and a memory card according to the present invention.
Figure 2B:
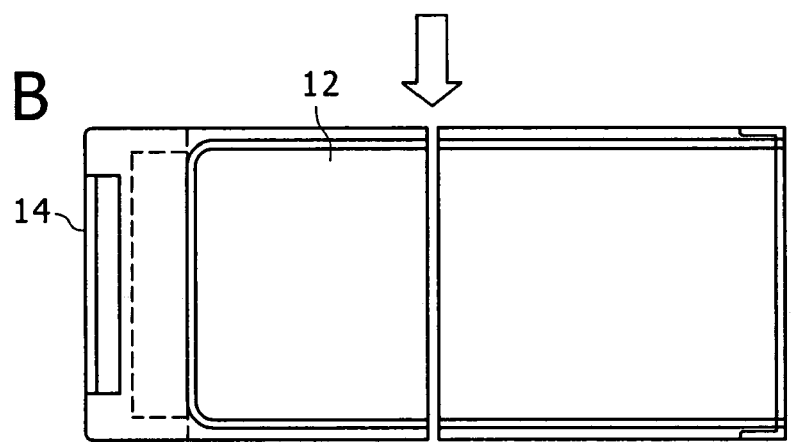
Figure 2C:
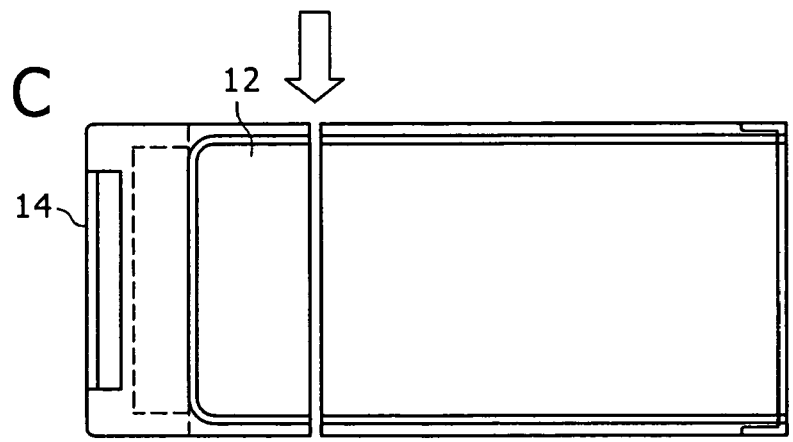

The length of the first case 22 has a dimension smaller than that of the length of the Express Card 10 and is, for example, a dimension obtained by a portion of the Express Card 10 cut away in the lengthwise direction as seen in FIGS. 2A, 2B and 2C.

As shown in FIG. 3, the first case 22 includes an upper case 2202, a lower case 2204, a front cap 2206, and a rear cap 2208. The front cap 2206 is attached to the front end of the upper case 2202 and the lower case 2204 placed one on the other while the rear cap 2208 is attached to the rear end of the upper case 2202 and the lower case 2204.

The electronic part 24 is accommodated in an internal space defined by the upper case 2202, lower case 2204, front cap 2206 and rear cap 2208.

The electronic part 24 includes a printed board 2402 formed from a conductor pattern formed on an insulating board and having a length and a width, and a pair of parts 2404 mounted on the printed board 2402 each including a memory device and an IC for driving the memory device. The electronic part 24 is disposed in the first case 22 such that the lengthwise direction and the widthwise direction of the printed board 2402 coincide with the lengthwise direction and the widthwise direction of the first case 22, respectively.

A plurality of contacts 2408 are provided in a spaced relationship from each other in the widthwise direction at a front portion of the printed board 2402 which faces the front cap 2206.

The front cap 2206 has an accommodating space 2209 which extends in the widthwise direction and the forward and backward direction when the front cap 2206 is attached to the front end of the upper case 2202 and the lower case 2204. The accommodating space 2209 is open forwardly through an opening 2210 provided on the front side of the front cap 2206.

The contacts 2408 of the printed board 2402 are positioned in the accommodating space 2209, and the connector 26 is formed from the accommodating space 2209, opening 2210 and contacts 2408.

The attachment 30 includes a second case 32 having a length as seen in FIGS. 4A and 4B.

The length of the second case 32 in this instance is determined depending upon the length of the first case 22 as seen in FIGS. 2A, 2B and 2C and set such that, when the first case 22 and the second case 32 are assembled to each other, the length of them has a dimension equal to that of the length of the Express Card 10.

Mounting portions to which the first case 22 and the second case 32 are removably attached are provided at a trailing or rear end (the other or second end in the lengthwise direction) of the first case 22 and the front end (first end in the lengthwise direction) of the second case 32 in a state wherein the lengthwise directions thereof are juxtaposed with each other. In the present embodiment, the mounting portions are configured such that the first case 22 and the second case 32 are removably attached thereto in a state wherein they are coincident with each other in the widthwise and thicknesswise directions (the upper and lower faces of the first case 22 and the upper and lower faces of the second case 32 extend along the same planes and the left and right side faces of the first case 22 and the left and right faces of the second case 32 extend along the same planes).

The mounting portion of the first case 22 includes an engaging convex portion 2210 and two pairs of locking concave portions 2212 provided at the second end in the lengthwise direction of the first case 22.

The engaging convex portion 2210 is formed so as to have a cross section a little smaller than the other portion of the first case 22.

The locking concave portions 2212 are provided in a spaced relationship from each other in the widthwise direction two by two on the upper and lower faces of the opening 2210 which are positioned at the opposite ends in the thicknesswise direction. The engaging convex portion 2210 and the locking concave portions 2212 function as a positioning member and positioning holes when the attachment 30 is attached to the memory card 20.

The mounting portion of the second case 32 includes an engaging concave portion 3202 into which the engaging convex portion 2210 is to be fitted, and two pairs of locking pawls 3204 resiliently deformable in the upper and lower directions and provided in a spaced relationship from each other in the widthwise direction two by two on the upper and lower faces of the second case 32.

The locking pawls 3204 of the second case 32 can be lockably engaged with the locking concave portions 2212 of the first case 22 while the engaging convex portion 2210 of the first case 22 is inserted in the engaging concave portion 3202 of the second case 32 to couple the first case 22 and the second case 32 integrally to each other. In the present embodiment, a releasable locking mechanism for retaining the state wherein the engaging convex portion 2210 is fitted in the engaging concave portion 3202 to position the second case 32 with respect to the first case 22 is formed from the locking pawls 3204 and the locking concave portions 2212.

The outer profile presented by the first case 22 and the second case 32 in a state wherein the first case 22 and the second case 32 are coupled integrally to each other is same as that of the Express Card 10.

Cancellation of the coupling between the first case 22 and the second case 32 is performed by pulling the first case 22 and the second case 32 away from each other along the lengthwise direction to cancel the locking engagement between the locking concave portions 2212 and the locking pawls 3204. It is to be noted that the locking engagement between the locking concave portions 2212 and the locking pawls 3204 is canceled only when force stronger than the force necessary to release the connector 26 and a connector for the Express Card from each other while they are in a mutually coupled state is applied.

According to the memory card 20 having such a configuration as described above, the memory card 20 by itself can be inserted into a slot provided in and used together with an electronic apparatus of a small size such as a portable telephone set. Further, if the attachment 30 is coupled to the memory card 20, then the memory card 20 can be inserted and removed readily and with certainty into and from a slot for exclusive use for the Express Card provided in an external apparatus such as a personal computer.

For example, if the memory card 20 by itself is inserted into a slot for exclusive use for the Express Card, then since the depth of the slot (dimension in the insertion direction of the memory card 20) is greater than the dimension of the memory card 20 in the lengthwise direction, such a situation occurs that the memory card 20 drops to the inner side of the slot and cannot be taken out. However, according to the memory card of the present embodiment, where the attachment 30 is used, the memory card 20 and the attachment 30 generally have an outer profile same as that of the Express Card, and therefore, the disadvantage described can be eliminated with certainty.

Second Embodiment

Now, a card type peripheral apparatus according to a second embodiment of the present invention is described.

The card type peripheral apparatus of the second embodiment is similar in configuration to the card type peripheral apparatus of the first embodiment described above, but is different only in the configuration of the mounting portions of the first case 22 and the second case 32.

Figure 5:
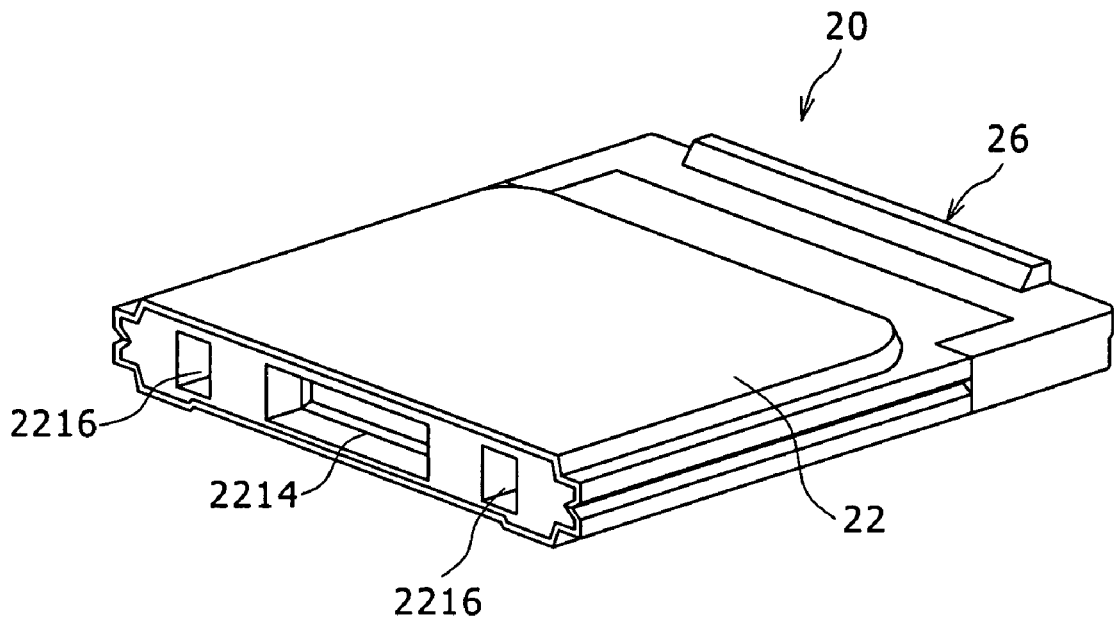
FIG. 5 is a perspective view of a memory card of a second embodiment of the present invention.

Referring to FIG. 5, the memory card 20 includes, similarly as in the memory card of the first embodiment, a first case 22, an electronic part not shown accommodated in the first case 22, and a connector 26 provided at a leading or front end (one or first end in the longitudinal direction) of the first case 22.

Figure 6:
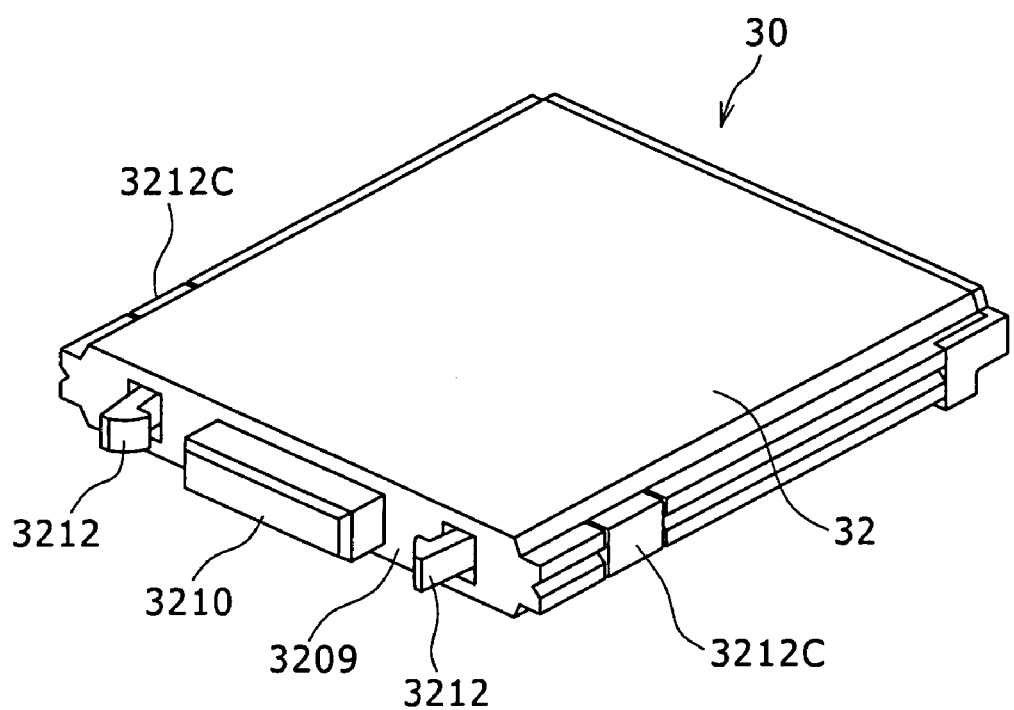
FIG. 6 is a perspective view of an attachment for use with the memory card of FIG. 5.

Referring now to FIG. 6, the attachment 30 includes a second case 32 having a length. The second case 32 has a width and a thickness of dimensions equal to those of the width and the thickness of the first case 22.

Similarly as in the memory card of the first embodiment, the length of the second case 32 is determined depending upon the length of the first case 22 as seen in FIGS. 2A, 2B and 2C. The first case 22 and the second case 32 are configured such that the length of the first case 22 and the second case 32 in a state wherein they are attached to each other has a dimension equal to that of the length of the Express Card 10.

Mounting portions to which the first case 22 and the second case 32 are removably attached are provided at a trailing or rear end (the other or second end in the lengthwise direction)

of the first case 22 and the front end (first end in the lengthwise direction) of the second case 32 in a state wherein the lengthwise directions thereof are juxtaposed with each other. Similarly as in the memory card of the first embodiment, the mounting portions are configured such that the first case 22 and the second case 32 are removably attached thereto in a state wherein they are coincident with each other in the widthwise and thicknesswise directions.

Figure 7:
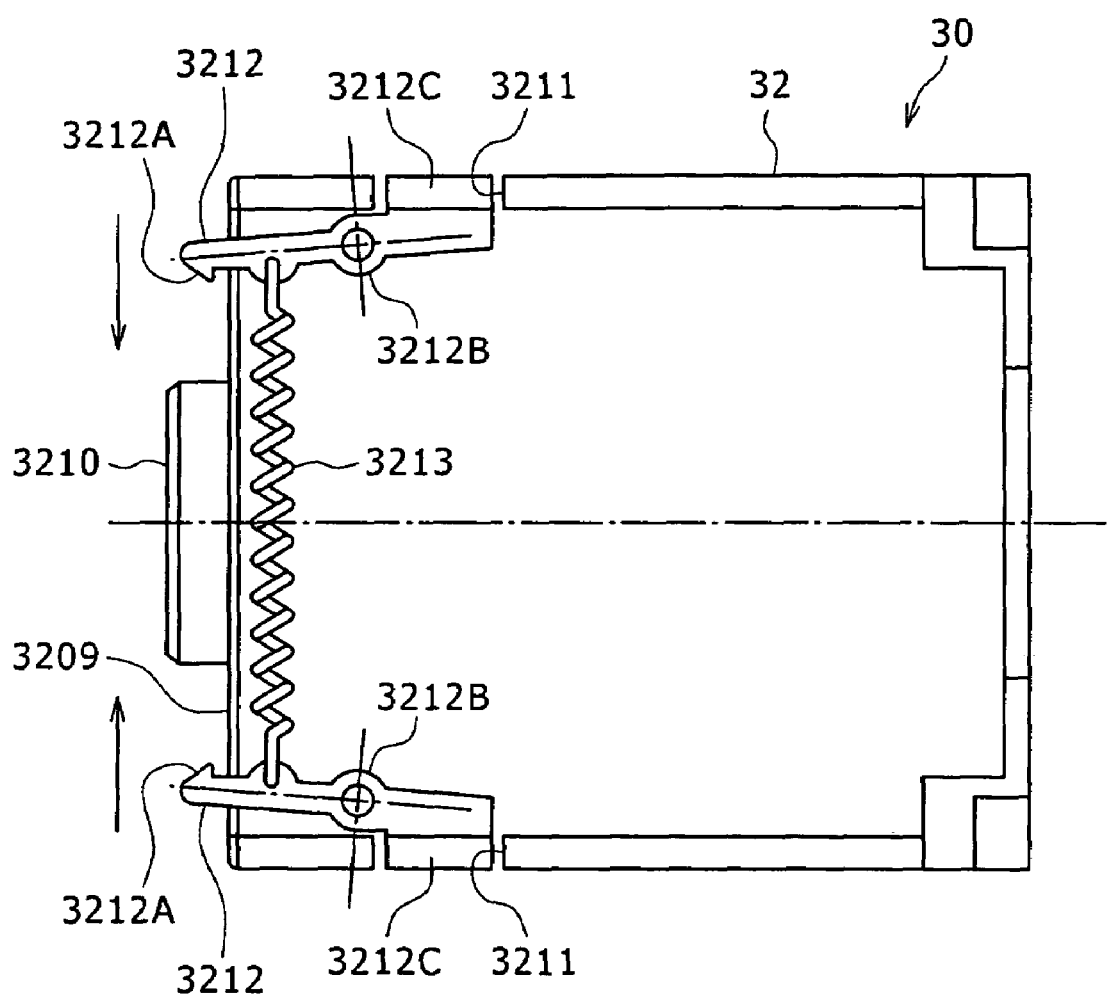
FIG. 7 is a schematic view showing a configuration of the attachment of FIG. 6.

Referring to FIGS. 6 and 7, the mounting portion of the second case 32 includes an engaging convex portion 3210 which projects in the lengthwise direction from an end face 3209 in the lengthwise direction of the second case 32 and a pair of locking pawls 3212 projecting in the lengthwise direction.

The engaging convex portion 3210 is provided at the center in the widthwise direction of the second case 32 and formed so as to have a cross section smaller than that of the other portion of the second case 32.

The locking pawls 3212 are formed such that they project from portions of the end face 3209 on the opposite sides of the engaging convex portion 3210 in the widthwise direction.

Referring to FIG. 7, each of the locking pawls 3212 has a free end portion 3212A projecting forwardly from the end face 3209 and is supported at an intermediate portion 3212B for rocking motion around an axis extending in the thicknesswise direction of the second case 32. A rear portion 3212C of each of the locking pawls 3212 is exposed to the outside of the second case 32 through one of openings 3211 provided on the opposite sides in the widthwise direction of the second case 32.

A coil spring 3213 extends between the free end portions 3212A of the locking pawls 3212 in the inside of the second case 32 such that locking pawls 3212 are normally biased in a direction in which the free end portions 3212A thereof are moved toward each other.

Each of the locking pawls 3212 is adapted to be abutted with a stopper not shown to position the rear portion 3212C on a plane same as the outer face of the second case 32 or inwardly of the plane in the widthwise direction, and when the rear portion 3212C is pushed inwardly in the widthwise direction, the free end portion 3212A of the locking pawl 3212 is expanded outwardly in the widthwise direction.

Referring back to FIG. 5, the mounting portion of the first case 22 includes an engaging concave portion 2214 for engaging with the engaging convex portion 3210, and a pair of locking concave portions 2216 for being lockably engageable with the locking pawls 3212. The engaging convex portion 3210 and the engaging concave portion 2214 function as a positioning member and a positioning hole when the attachment 30 is attached to the memory card 20. In the present embodiment, a releasable locking mechanism for retaining the state wherein the engaging convex portion 3210 is fitted in the engaging concave portion 2214 to position the second case 32 with respect to the first case 22 is formed from the locking pawls 3212 and the locking concave portions 2216.

The engaging concave portion 2214 is provided at a central portion of the first case 22 in the widthwise direction, and the locking concave portions 2216 are provided on the opposite sides of the engaging concave portion 2214.

Figure 8A:
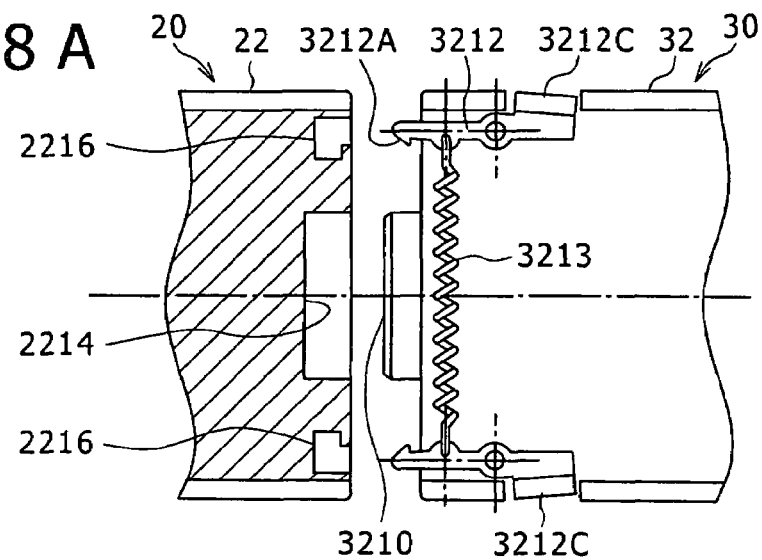
FIGS. 8A, 8B and 8C are schematic views illustrating attaching and detaching operation of the memory card of FIG. 5 and the attachment of FIG. 6.
Figure 8B:
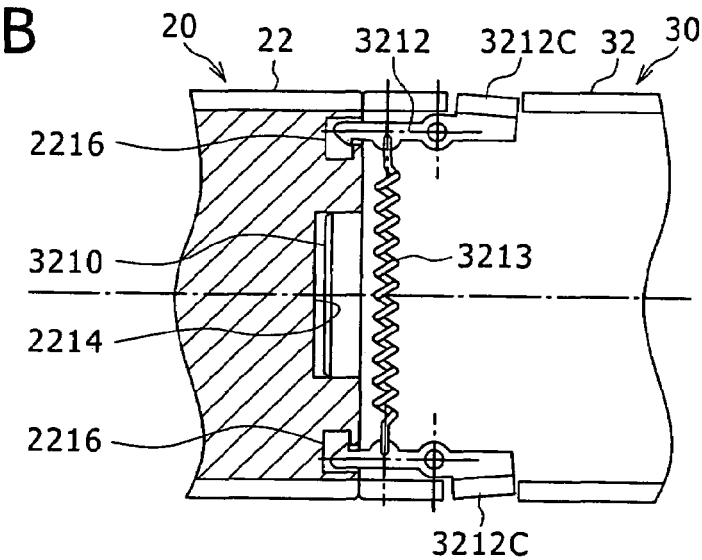
Figure 8C:
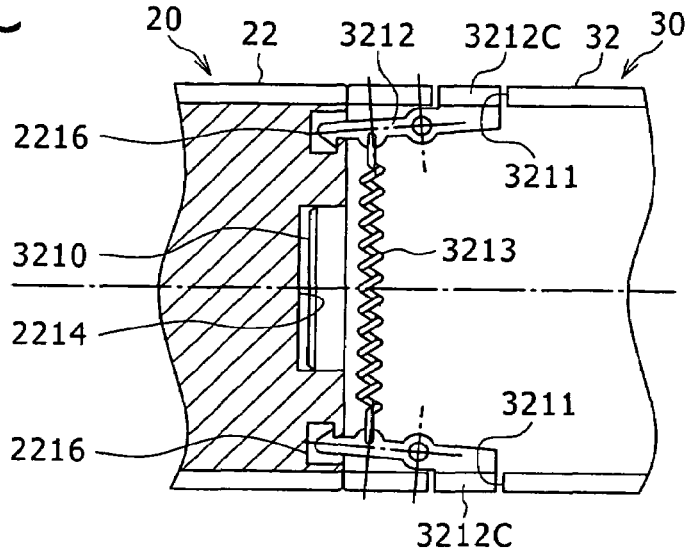

As seen in FIGS. 8A, 8B and 8C, when the engaging convex portion 3210 of the second case 32 is inserted into the engaging concave portion 2214 of the first case 22, the free end portions 3212A of the locking pawls 3212 of the second case 32 are lockably engaged with the locking concave portions 2216 of the first case 22 to couple the first case 22 and the second case 32 integrally to each other. In other words, the attachment 30 to the memory card 20 can be connected by a simple operation of merely inserting the engaging convex portion 3210 of the attachment 30 into the engaging concave portion 2214 of the memory card 20.

The outer profile of the first case 22 and the second case 32 in a state wherein the first case 22 and the second case 32 are coupled integrally to each other is same as that of the Express Card 10.

Cancellation of the coupling between the first case 22 and the second case 32 is performed by pushing the rear portions 3212C of the two locking pawls 3212 of the second case 32 inwardly in the widthwise direction to cancel the lockable engagement between the locking concave portions 2216 of the first case 22 and the free end portions 3212A of the locking pawls 3212 of the second case 32 and moving, in this state, the first case 22 and the second case 32 in directions in which they are spaced away from each other in the lengthwise direction as seen in FIG. 8C.

According to the memory card 20 having such a configuration as described above, operation and effects similar to those of the memory card of the first embodiment can be achieved.

Third Embodiment

Now, a card type peripheral apparatus according to a third embodiment of the present invention is described.

The memory card of the third embodiment is similar in configuration to the memory cards of the first and second embodiments described but is different only in the configuration of the mounting portions of the first case 22 and the second case 32.

Figure 9:
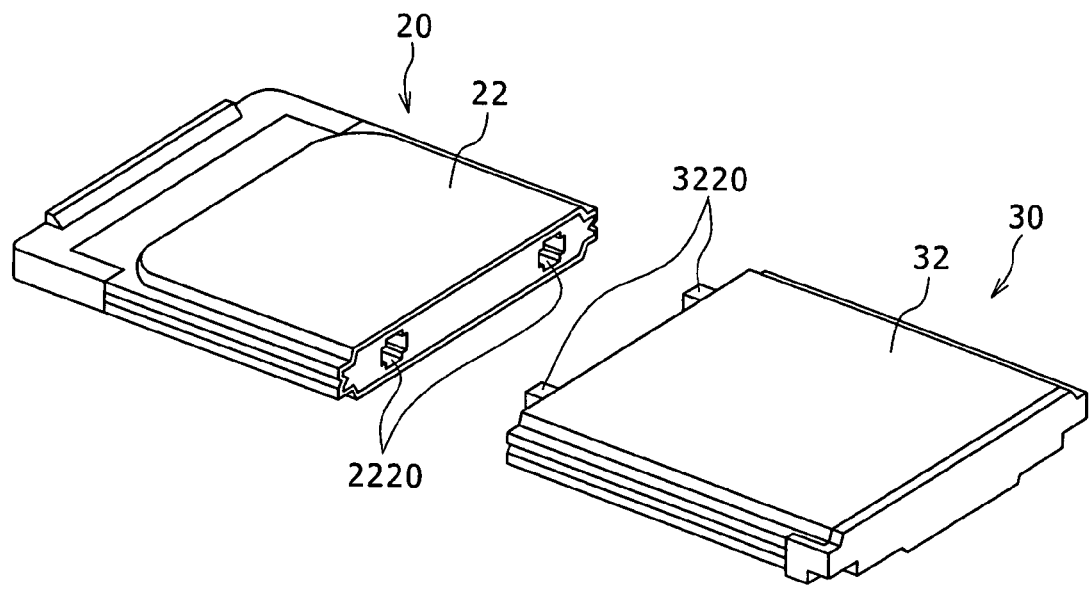
FIGS. 9 and 10 are perspective views of a memory card and an attachment of a third embodiment of the present invention.
Figure 10:
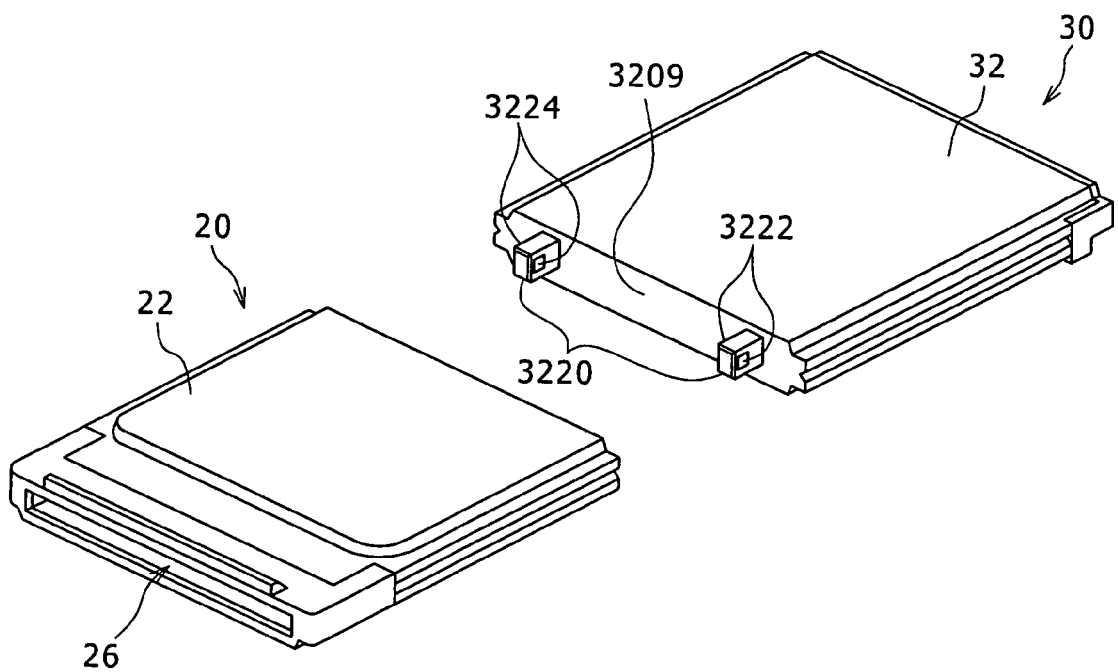

Referring to FIGS. 9 and 10, the memory card 20 includes, similarly as in the memory card of the first embodiment, a first case 22, an electronic part not shown accommodated in the first case 22, and a connector 26 provided at a leading or front end (one or first end in the longitudinal direction) of the first case 22.

The attachment 30 includes a second case 32 having a length. The second case 32 has a width and a thickness of dimensions equal to those of the width and the thickness of the first case 22.

Similarly as in the memory card of the first embodiment, the length of the second case 32 is determined depending upon the length of the first case 22 as seen in FIGS. 2A, 2B and 2C. The first case 22 and the second case 32 are configured such that the length of the first case 22 and the second case 32 in a state wherein they are attached to each other has a dimension equal to that of the length of the Express Card 10.

Mounting portions to which the first case 22 and the second case 32 are removably attached are provided at a trailing or rear end (the other or second end in the lengthwise direction) of the first case 22 and the front end (first end in the lengthwise direction) of the second case 32 in a state wherein the lengthwise directions thereof are juxtaposed with each other. Similarly as in the memory card of the first embodiment, the mounting portions are configured such that the first case 22 and the second case 32 are removably attached thereto in a state wherein they are coincident with each other in the widthwise and thicknesswise directions.

Referring to FIG. 10, the mounting portion of the second case 32 includes a pair of engaging convex portions 3220 which project in the lengthwise direction from an end face 3209 in the lengthwise direction of the second case 32 and a pair of locking concave portions 3222 provided on each of the engaging convex portions 3220.

The engaging convex portions 3220 are provided in a spaced relationship from each other in the widthwise direction of the second case 32 and each formed in a shape of a rectangular prism having a length, a width and a thickness along the lengthwise, widthwise and thicknesswise directions of the second case 32, respectively.

The locking concave portions 3222 are provided on the opposite side faces in the widthwise direction of the engaging convex portions 3220. Consequently, totaling four locking concave portions 3222 are provided.

Figure 11:
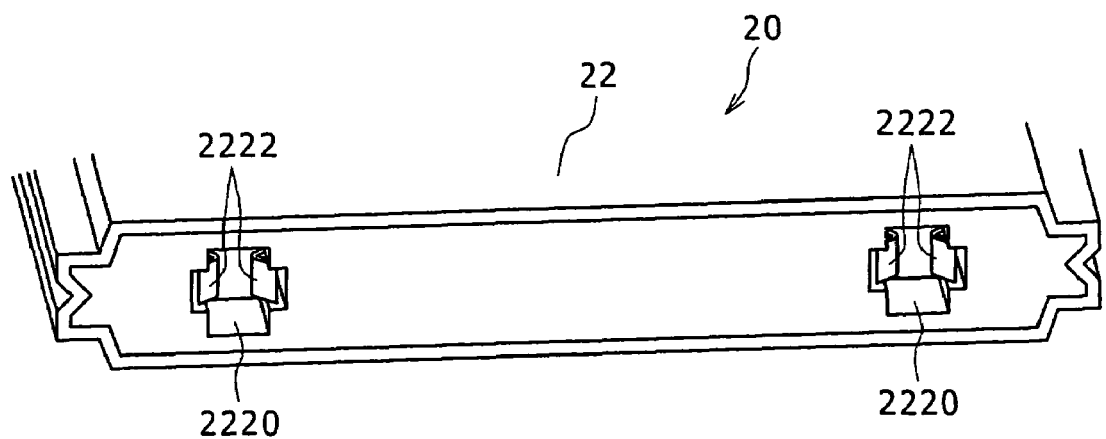
FIG. 11 is a partial enlarged perspective view of the memory card shown in FIG. 9.

Referring to FIGS. 9 and 11, the mounting portion of the first case 22 includes a pair of engaging concave portions 2220 for engaging with the engaging convex portions 3220, and a pair of holding springs 2222 provided in each of the engaging concave portions 2220.

The engaging concave portions 2220 are provided in a spaced relationship from each other in the widthwise direction of the first case 22.

The totaling four holding springs 2222 are provided on the opposite sides in the widthwise direction of the first case 22 in the engaging concave portions 2220. Each of the holding springs 2222 is provided for resilient deformation in the widthwise direction such that it can be removably engaged with a corresponding one of the locking concave portions 3222 of the engaging convex portions 3220 inserted in the engaging concave portions 2220.

In the present embodiment, the engaging convex portions 3220 and the engaging concave portions 2220 function as positioning members and positioning holes when the attachment 30 is attached to the memory card 20. Meanwhile, a releasable locking mechanism for retaining the state wherein the engaging convex portions 3220 are fitted in the engaging concave portions 2220 to position the second case 32 with respect to the first case 22 is formed from the holding springs 2222 and the locking concave portions 3222.

When the engaging convex portions 3220 of the second case 32 are inserted into the engaging concave portions 2220 of the first case 22, the holding springs 2222 of the first case 22 are lockably engaged with the locking concave portions 3222 of the second case 32 to couple the first case 22 and the second case 32 integrally to each other. In other words, the attachment 30 to the memory card 20 can be connected by a simple operation of merely inserting the engaging convex portions 3220 of the attachment 30 into the engaging concave portions 2220 of the memory card 20.

The outer profile of the first case 22 and the second case 32 in a state wherein the first case 22 and the second case 32 are coupled integrally to each other is same as that of the Express Card 10.

Cancellation of the coupling between the first case 22 and the second case 32 is performed by pulling the first case 22 and the second case 32 in directions away from each other along the lengthwise direction to cancel the lockable engagement between the holding springs 2222 and the 3222. It is to be noted that the locking engagement between the holding springs 2222 and the locking concave portions 3222 is canceled if force higher than the force necessary to release, in a state wherein the connector 26 and a connector for the Express Card are attached to each other, the connection between the connectors is applied.

According to the memory card 20 having such a configuration as described above, operation and effects similar to those of the memory card of the first embodiment can be achieved.

Fourth Embodiment

Now, a memory card according to a fourth embodiment of the present invention is described.

The memory card of the fourth embodiment is a modification to but is different from the memory card of the third embodiment in that, while the memory card of the third embodiment includes four holding springs 2222 for forming the mounting portion of the first case 22 and four locking concave portions 3222 for forming the mounting portion of the second case 32, the memory card of the fourth embodiment includes two holding springs 2222 for forming the mounting portion of the first case 22 and two locking concave portions 3222 for forming the mounting portion of the second case 32.

Figure 13:
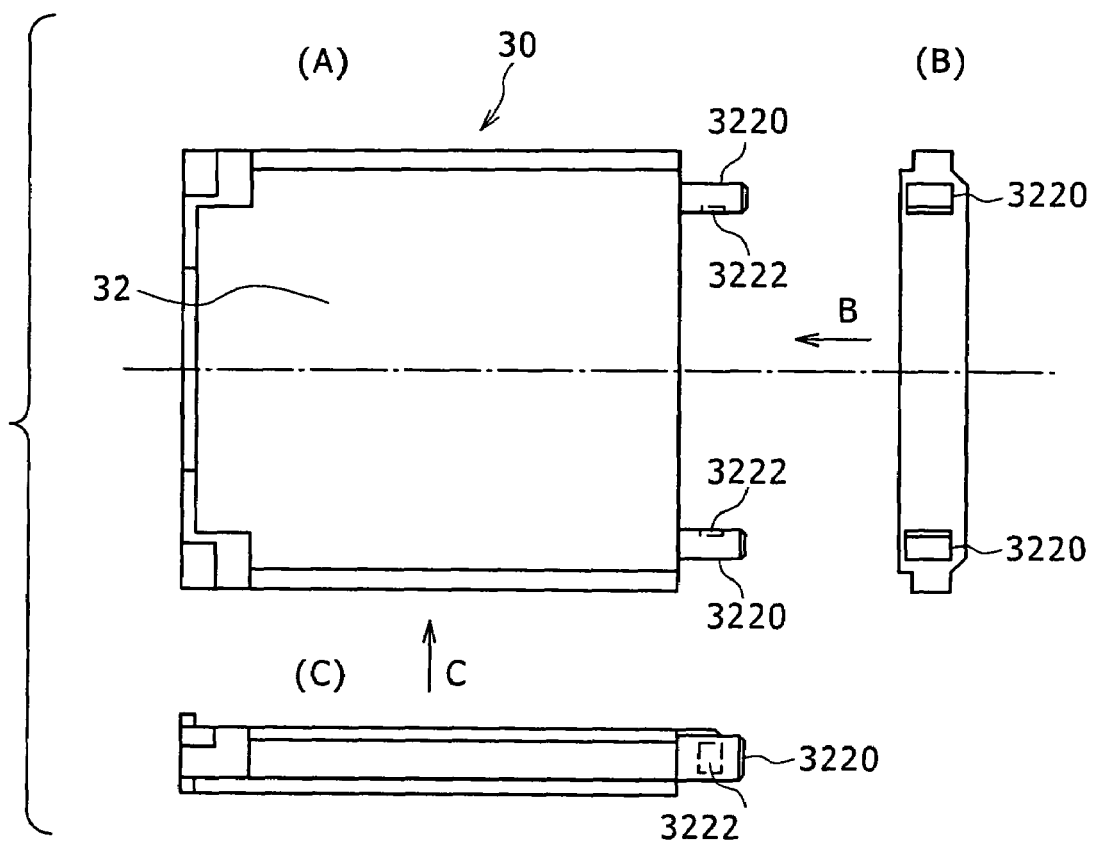
FIG. 13(A) is a top plan view of an attachment of the fourth embodiment of the present invention and FIGS. 13(B) and 13(C) are views as viewed in the directions indicated by arrow marks B and C in FIG. 13(A)

Referring to FIGS. 13(A) to 13(C), the mounting portion of the second case 32 includes a pair of engaging convex portions 3220 which project in the lengthwise direction from an end face 3209 in the lengthwise direction of the second case 32 and a pair of locking concave portions 3222 provided on the engaging convex portions 3220.

The two engaging convex portions 3220 are provided in a spaced relationship from each other in the widthwise direction of the second case 32 and each formed in a shape of a rectangular prism having a length, a width and a thickness along the lengthwise, widthwise and thicknesswise directions of the second case 32.

The locking concave portions 3222 are provided on side faces of the engaging convex portions 3220 which face the center in the widthwise direction. Consequently, totaling two locking concave portions 3222 are provided.

Figure 12:
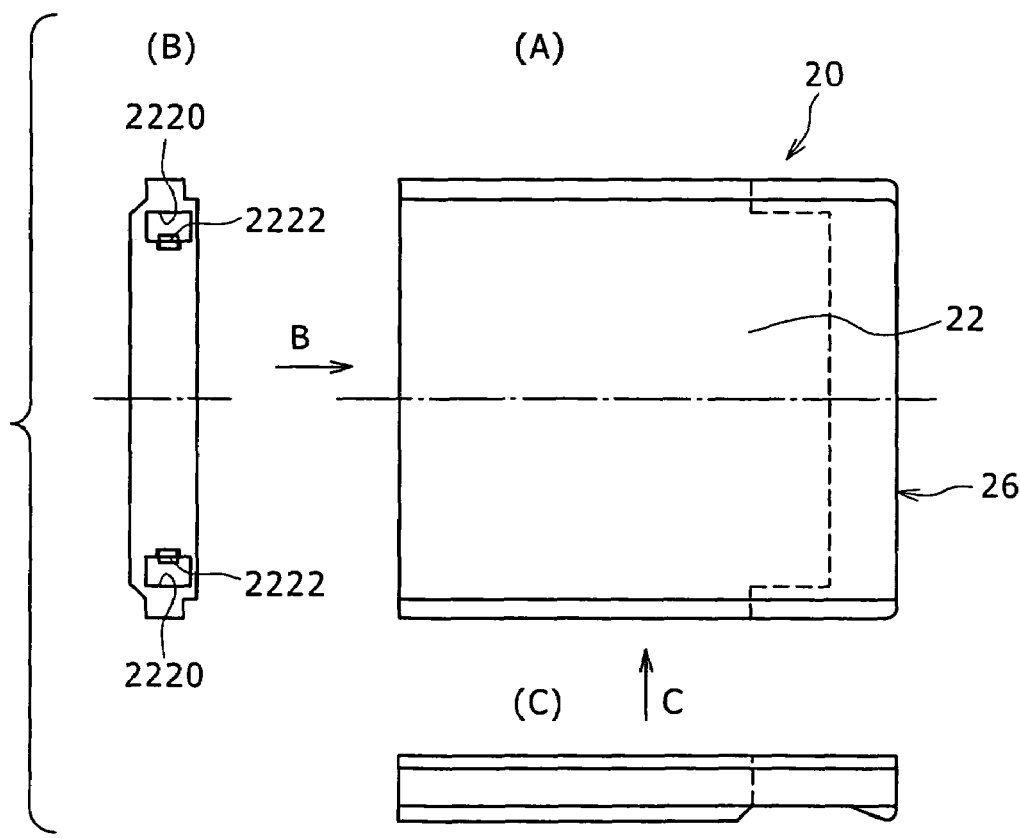
FIG. 12(A) is a top plan view of a memory card of a fourth embodiment of the present invention and FIGS. 12(B) and 12(C) are views as viewed in the directions indicated by arrow marks B and C in FIG. 12(A)

Referring to FIGS. 12(A) to 12(C), the mounting portion of the first case 22 includes a pair of engaging concave portions 2220 for engaging with the engaging convex portions 3220, and a pair of holding springs 2222 provided in the engaging concave portions 2220.

The two engaging concave portions 2220 are provided in a spaced relationship from each other in the widthwise direction of the first case 22.

The totaling two holding springs 2222 are provided at locations in the engaging concave portions 2220 which face the inner side in the widthwise direction of the first case 22. Each of the holding springs 2222 is provided for resilient deformation in the widthwise direction such that it can be removably engaged with a corresponding one of the locking concave portions 3222 of the engaging convex portions 3220 inserted in the engaging concave portions 2220.

Also in the present embodiment, the engaging convex portions 3220 and the engaging concave portions 2220 function as positioning members and positioning holes, respectively, when the attachment 30 is attached to the memory card 20 similarly as in the third embodiment. Meanwhile, a releasable locking mechanism for retaining the state wherein the engaging convex portions 3220 are fitted in the engaging concave portions 2220 to position the second case 32 with respect to the first case 22 is formed from the holding springs 2222 and the locking concave portions 3222.

Similarly as in the memory card of the third embodiment, when the engaging convex portions 3220 of the second case 32 are inserted into the engaging concave portions 2220 of the first case 22, the holding springs 2222 of the first case 22 are lockably engaged with the locking concave portions 3222 of the second case 32 to couple the first case 22 and the second case 32 integrally to each other. In other words, the attachment 30 to the memory card 20 can be connected by a simple operation of merely inserting the engaging convex portions 3220 of the attachment 30 into the engaging concave portions 2220 of the memory card 20.

The outer profile of the first case 22 and the second case 32 in a state wherein the first case 22 and the second case 32 are coupled integrally to each other is same as that of the Express Card 10. Further, cancellation of the coupling between the first case 22 and the second case 32 is performed by pulling the first case 22 and the second case 32 in directions away from each other along the lengthwise direction similarly as in the memory card of the third embodiment. It is to be noted that the locking engagement between the holding springs 2222 and the locking concave portions 3222 is canceled if force higher than the force necessary to release, in a state wherein the connector 26 and a connector for the Express Card are attached to each other, the connection between the connectors is applied.

According to the memory card 20 having such a configuration as described above, operation and effects similar to those of the memory card of the first embodiment can be achieved similarly to the memory card of the third embodiment.

Fifth Embodiment

Now, a memory card according to a fifth embodiment of the present invention is described.

The memory card of the fifth embodiment is a modification to but is different from the memory card of the third embodiment in that, while, in the memory card of the third embodiment, the locking concave portions 3222 of the second case 32 are provided on the opposite side faces in the widthwise direction of the engaging convex portions 3220 and the holding springs 2222 of the first case 22 are provided on the opposite sides in the widthwise direction of the first case 22 in the engaging concave portions 2220, in the memory card of the fifth embodiment, the locking concave portions 3222 of the second case 32 are provided on the opposite side faces in the thicknesswise direction of the engaging convex portions 3220 and the holding springs 2222 of the first case 22 are provided on the opposite sides in the thicknesswise direction of the first case 22 in the engaging concave portions 2220.

Figure 15:
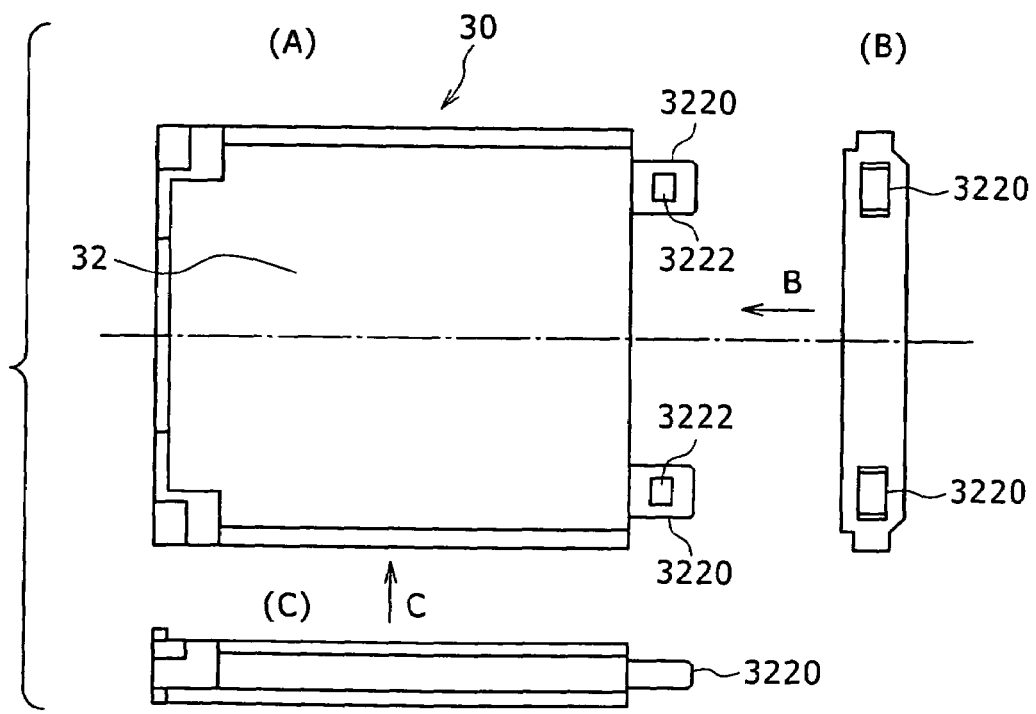
FIG. 15(A) is a top plan view of an attachment of the fifth embodiment of the present invention and FIGS. 15(B) and 15(C) are views as viewed in the directions indicated by arrow marks B and C in FIG. 15(A)

Referring to FIGS. 15(A) to 15(C), the mounting portion of the second case 32 includes a pair of engaging convex portions 3220 which project in the lengthwise direction from an end face 3209 in the lengthwise direction of the second case 32 and a pair of locking concave portions 3222 provided on each of the engaging convex portions 3220.

The engaging convex portions 3220 are provided in a spaced relationship from each other in the widthwise direction of the second case 32 and each formed in a shape of a rectangular prism having a length, a width and a thickness along the lengthwise, widthwise and thicknesswise directions of the second case 32.

The locking concave portions 3222 are provided on the opposite side faces in the thicknesswise direction of each of the engaging convex portions 3220. Consequently, totaling four locking concave portions 3222 are provided.

Figure 14:
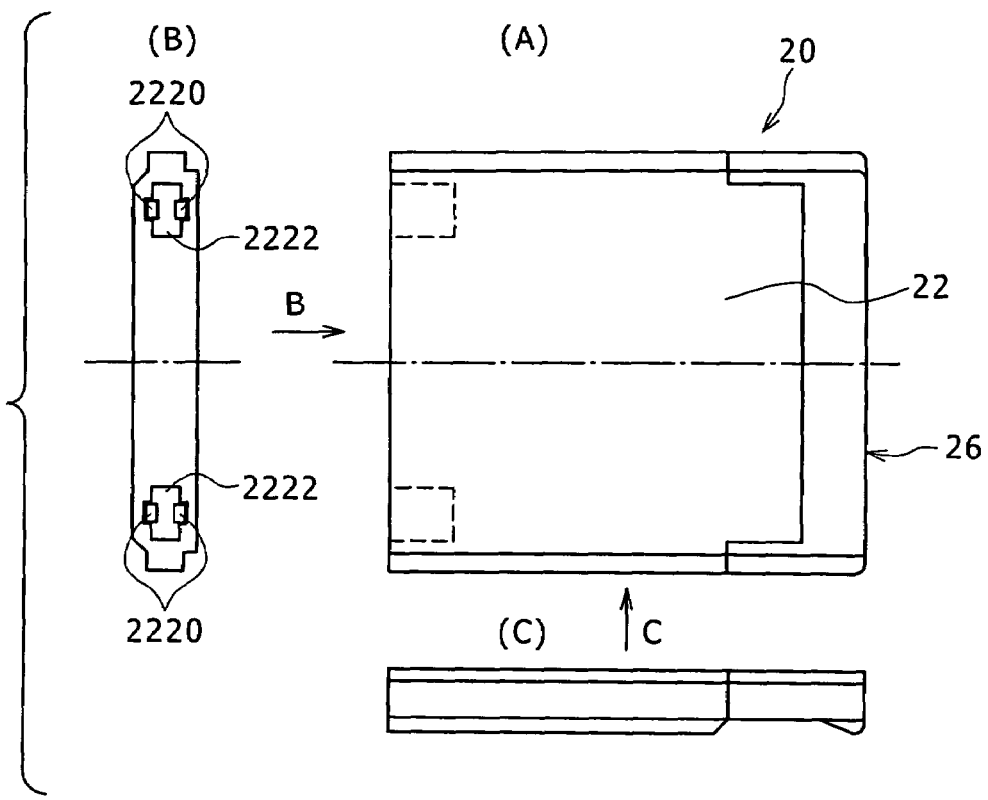
FIG. 14(A) is a top plan view of a memory card of a fifth embodiment of the present invention and FIGS. 14(B) and 14(C) are views as viewed in the directions indicated by arrow marks B and C in FIG. 14(A)

Referring to FIGS. 14(A) to 14(C), the mounting portion of the first case 22 includes a pair of engaging concave portions 2220 for engaging with the engaging convex portions 3220, and a pair of holding springs 2222 provided in each of the engaging concave portions 2220.

The two engaging concave portions 2220 are provided in a spaced relationship from each other in the widthwise direction of the first case 22.

The totaling four holding springs 2222 are provided at locations on the opposite sides in the widthwise direction of the first case 22 in the engaging concave portions 2220. Each of the holding springs 2222 is provided for resilient deformation in the thicknesswise direction such that it can be removably engaged with a corresponding one of the locking concave portions 3222 of the engaging convex portions 3220 inserted in the engaging concave portions 2220.

Also in the memory card of the present embodiment, the engaging convex portions 3220 and the engaging concave portions 2220 function as positioning members and positioning holes, respectively, when the attachment 30 is attached to the memory card 20 similarly as in the third embodiment. Meanwhile, a releasable locking mechanism for retaining the state wherein the engaging convex portions 3220 are fitted in the engaging concave portions 2220 to position the second case 32 with respect to the first case 22 is formed from the holding springs 2222 and the locking concave portions 3222.

Similarly as in the memory card of the third embodiment, when the engaging convex portions 3220 of the second case 32 are inserted into the engaging concave portions 2220 of the first case 22, the holding springs 2222 of the first case 22 are lockably engaged with the locking concave portions 3222 of the second case 32 to couple the first case 22 and the second case 32 integrally to each other. In other words, the attachment 30 to the memory card 20 can be connected by a simple operation of merely inserting the engaging convex portions 3220 of the attachment 30 into the engaging concave portions 2220 of the memory card 20.

The outer profile of the first case 22 and the second case 32 in a state wherein the first case 22 and the second case 32 are coupled integrally to each other is same as that of the Express Card 10. Further, cancellation of the coupling between the first case 22 and the second case 32 is performed by pulling the first case 22 and the second case 32 in directions away from each other along the lengthwise direction similarly as in the memory card of the third embodiment. It is to be noted that the locking engagement between the holding springs 2222 and the locking concave portions 3222 is canceled if force higher than the force necessary to release, in a state wherein the connector 26 and a connector for the Express Card are attached to each other, the connection between the connectors is applied.

According to the memory card 20 having such a configuration as described above, operation and effects similar to those of the memory card of the first embodiment can be achieved similarly to the memory card of the third embodiment.

Sixth Embodiment

Now, a memory card according to a sixth embodiment of the present invention is described.

The memory card of the sixth embodiment is a modification to but is different from the memory card of the first embodiment in that a retractable projection is provided on the surface of the first case 22 such that it is retracted into the inside of the first case 22 when the mounting portion of the second case 32 is attached to the mounting portion of the first case 22.

Figure 16:
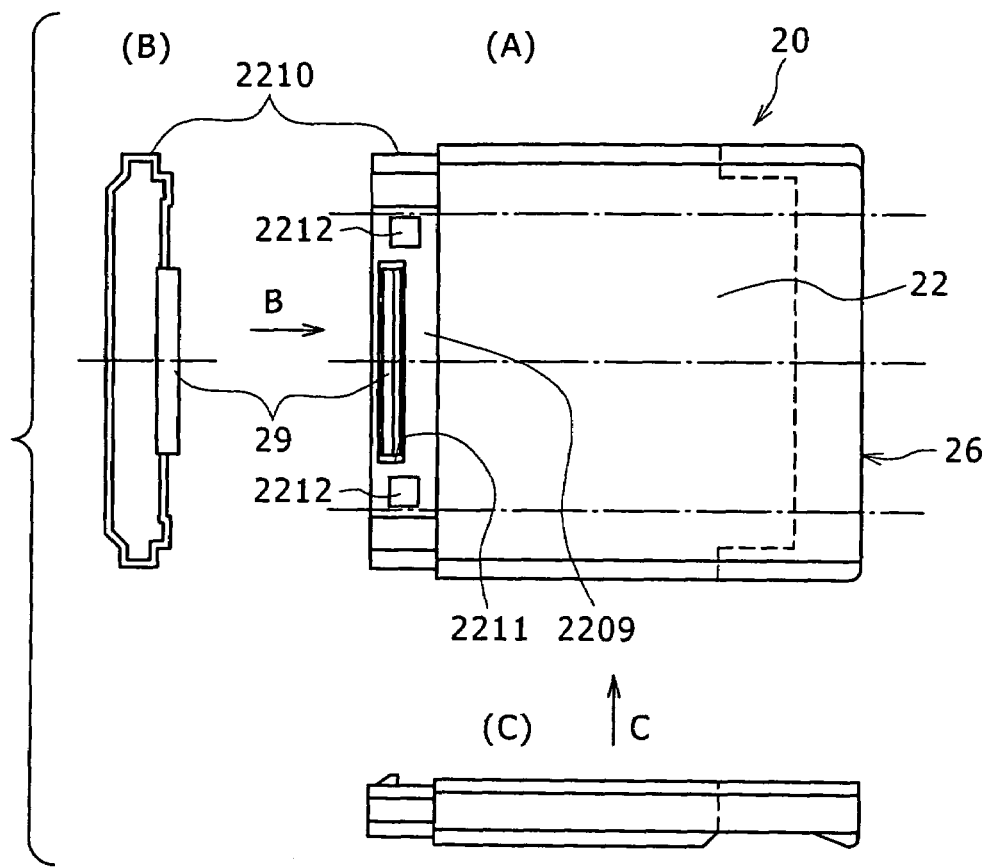
FIG. 16(A) is a top plan view of a memory card of a sixth embodiment of the present invention and FIGS. 16(B) and 16(C) are views as viewed in the directions indicated by arrow marks B and C in FIG. 16(A)
Figure 17:
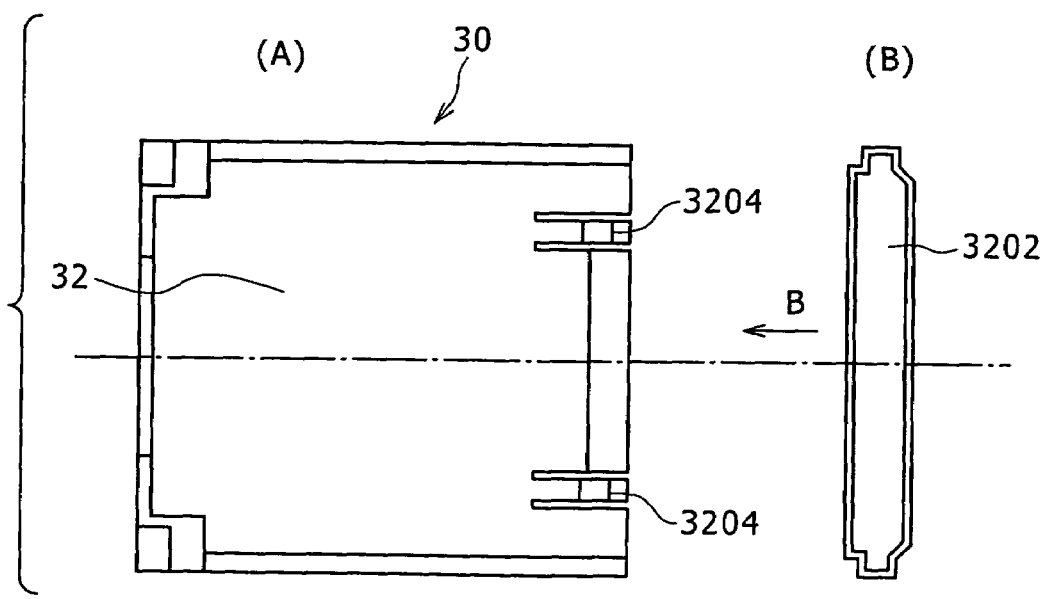
FIG. 17(A) is a top plan view of an attachment of the sixth embodiment of the present invention and FIGS. 17(B) and 17(C) are views as viewed in the directions indicated by arrow marks B and C in FIG. 17(A)
Figure 18A:
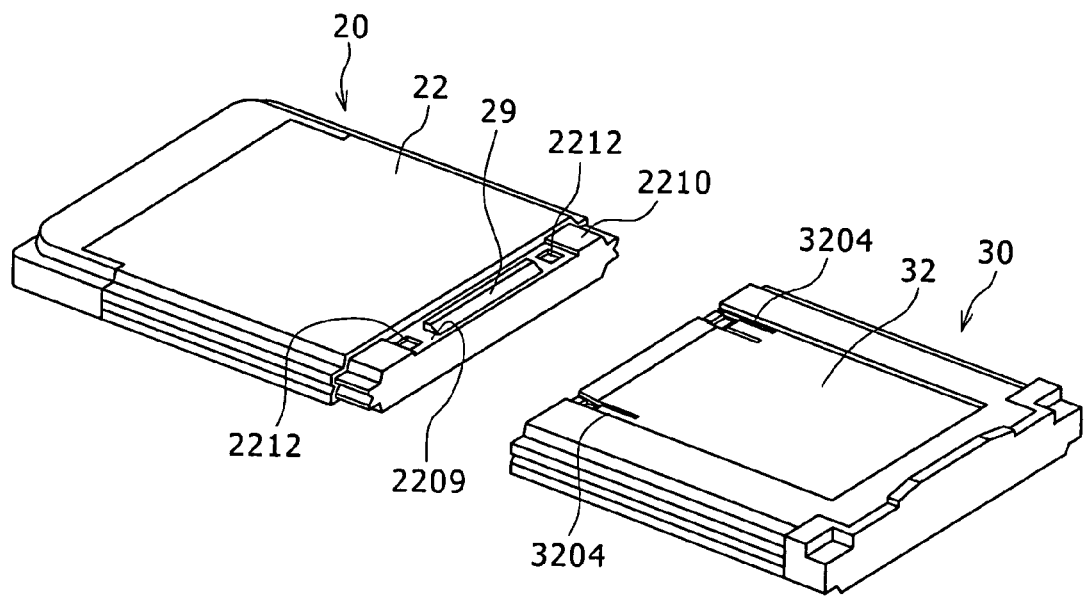
FIGS. 18A and 18B are perspective views of the memory card of FIGS. 16(A) to 16(C) and the attachment of FIGS. 17(A) to 17(C)
Figure 18B:
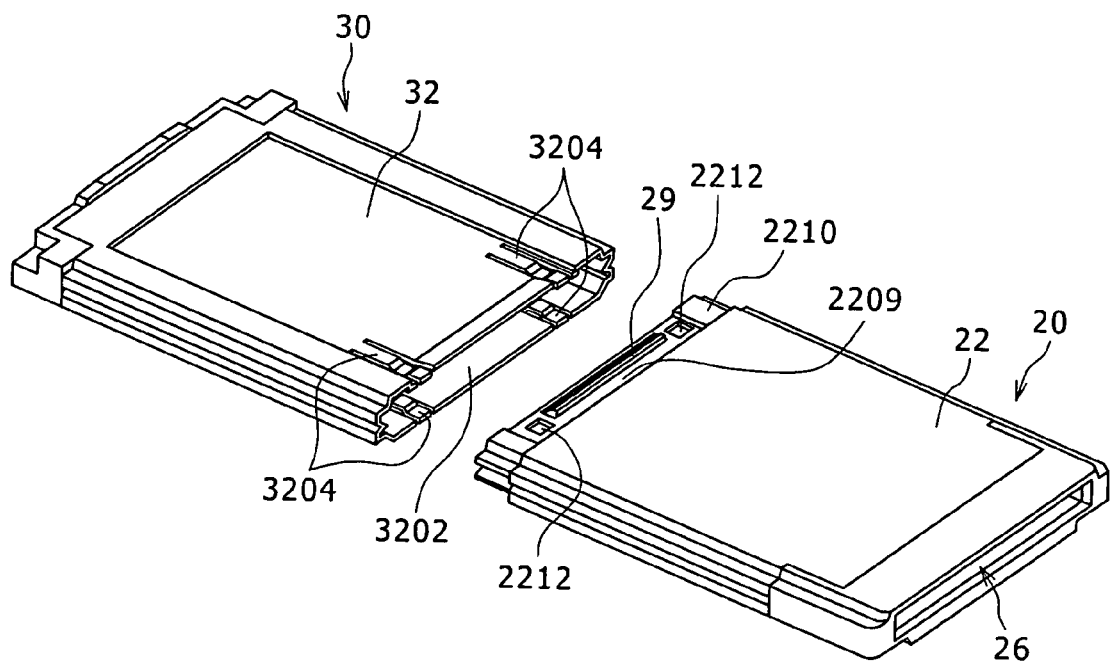

Referring to FIGS. 16(A) to 16(C), the memory card 20 includes, similarly as in the memory card of the first embodiment, a first case 22, an electronic part not shown accommodated in the first case 22, and a connector 26 provided at a leading or front end (one or first end in the longitudinal direction) of the first case 22.

The attachment 30 includes a second case 32 having a length. The second case 32 has a width and a thickness of dimensions equal to those of the width and the thickness of the first case 22.

Similarly as in the memory card of the first embodiment, the length of the second case 32 is determined depending upon the length of the first case 22 as seen in FIGS. 2A, 2B and 2C. The first case 22 and the second case 32 are configured such that the length of the first case 22 and the second case 32 in a state wherein they are attached to each other has a dimension equal to that of the length of the Express Card 10.

Mounting portions to which the first case 22 and the second case 32 are removably attached are provided at a trailing or rear end (the other or second end in the lengthwise direction) of the first case 22 and the front end (first end in the lengthwise direction) of the second case 32 in a state wherein the lengthwise directions thereof are juxtaposed with each other. Similarly as in the memory card of the first embodiment, the mounting portions are configured such that the first case 22 and the second case 32 are removably attached thereto in a state wherein they are coincident with each other in the widthwise and thicknesswise directions.

The mounting portion of the first case 22 includes an engaging convex portion 2210 and two pairs of locking concave portions 2212 provided at the second end in the lengthwise direction of the first case 22.

The engaging convex portion 2210 is formed so as to have a cross section a little smaller than the other portion of the first case 22.

The locking concave portions 2212 are provided in a spaced relationship from each other in the widthwise direction two by two on the upper and lower faces of the engaging convex portion 2210 which are positioned at the opposite ends in the thicknesswise direction.

The mounting portion of the second case 32 includes an engaging concave portion 3202 into which the engaging convex portion 2210 is to be fitted, and two pairs of locking pawls 3204 resiliently deformable in the upper and lower directions and provided in a spaced relationship from each other in the widthwise direction two by two on the upper and lower faces of the second case 32.

The locking pawls 3204 of the second case 32 can be lockably engaged with the locking concave portions 2212 of the first case 22 while the engaging convex portion 2210 of the first case 22 is inserted in the engaging concave portion 3202 of the second case 32 to couple the first case 22 and the second case 32 integrally to each other. The engaging convex portion 2210 and the engaging concave portion 3202 function as a positioning member and a positioning hole when the attachment 30 is attached to the memory card 20. In the present embodiment, a releasable locking mechanism for retaining the state wherein the engaging convex portion 2210 is fitted in the engaging concave portion 3202 to position the second case 32 with respect to the first case 22 is formed from the locking pawls 3204 and the locking concave portions 2212.

The outer profile presented by the first case 22 and the second case 32 in a state wherein the first case 22 and the second case 32 are coupled integrally to each other is same as that of the Express Card 10.

Cancellation of the coupling between the first case 22 and the second case 32 is performed by pulling the first case 22 and the second case 32 away from each other along the lengthwise direction to cancel the locking engagement between the locking concave portions 2212 and the locking pawls 3204. It is to be noted that the locking engagement between the locking concave portions 2212 and the locking pawls 3204 is canceled only when force stronger than the force necessary to release the connector 26 and a connector for the Express Card from each other while they are in a mutually coupled state is applied.

A projection 29 is disposed at a rear end of the first case 22 such that it can be retracted from an upper face (surface) 2209 positioned at an end portion of the thickness wise direction of the first case 22.

An interlocking mechanism is connected to the projection 29 such that, when the mounting portion of the second case 32 is attached to the mounting portion of the first case 22, the projection 29 is retracted into the inside of the first case 22 from the upper face 2209 by the interlocking mechanism.

Figure 19A:
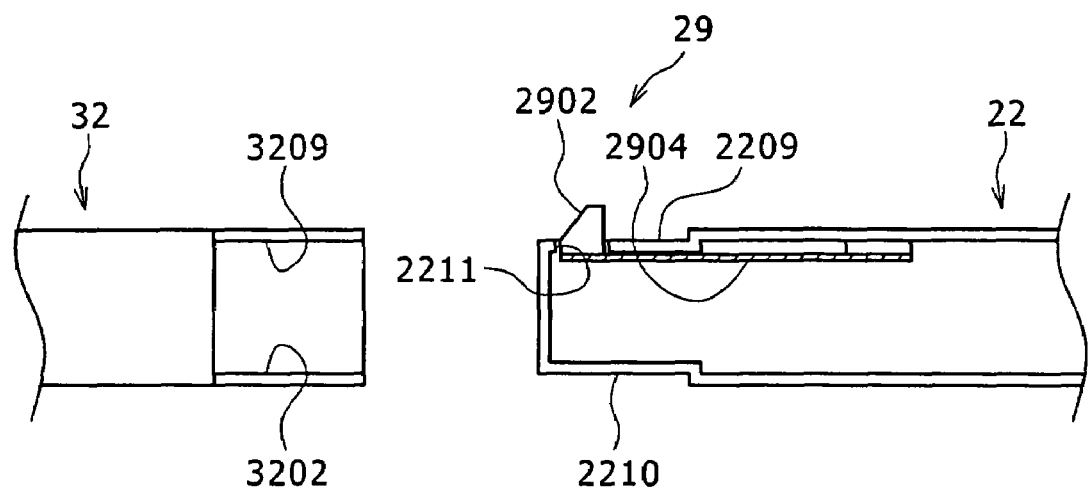
FIGS. 19A and 19B are side elevational sectional views illustrating attaching and detaching operation of the memory card of FIGS. 16(A) to 16(C) and the attachment of FIGS. 17(A) to 17(C)

Referring to FIG. 19A, the projection 29 is formed from a block 2902 having a shape of a triangular pyramid and disposed in an opening 2211 formed to extend in the widthwise direction on the upper face 2209 of the first case 22. The block 2902 is attached to a free end of a leaf spring 2904 disposed in the inside of the first case 22.

The leaf spring 2904 is attached at a base end thereof to an internal location of the first case 22 and normally biases the block 2902 so as to project outwardly of the upper face 2209 through the opening 2211.+

Figure 19B:
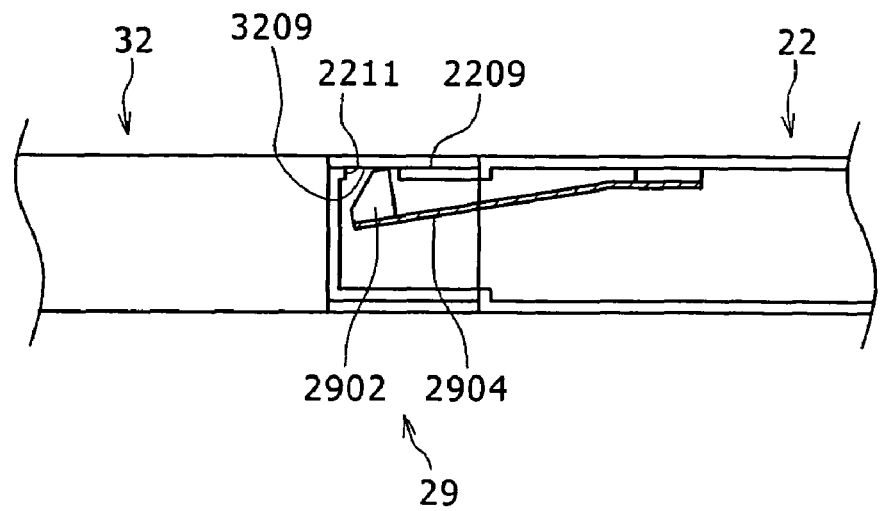

Referring to FIG. 19B, if the engaging convex portion 2210 of the first case 22 is fitted into the engaging concave portion 3202 of the second case 32, then the block 2902 is brought into contact with the wall portion 3209 of the second case 32 which forms the engaging concave portion 3202 of the second case 32. Consequently, the block 2902 is retracted into the inside of the first case 22 against the biasing force of the leaf spring 2904.

In the memory card of the present embodiment, an interlocking mechanism for retracting the projection 29 into the inside of the first case 22 when the mounting portion of the second case 32 is attached to the mounting portion of the first case 22 is formed from the leaf spring 2904.

According to the memory card 20 having such a configuration as described above, it naturally exhibits operation and effects similar to those of the memory card of the first embodiment. Besides, in the state wherein the attachment 30 is not attached to the memory card 20, since the projection 29 projects outwardly through the upper face 2209, even if the memory card 20 by itself is fitted into a slot only for exclusive use for the Express Card, the projection 29 which is positioned on the outer side of an edge portion of the slot is lockably engaged with the edge portion of the slot. Consequently, such a disadvantage that the memory card 20 drops to the inner side of the slot for exclusive use and cannot be taken out can be prevented with certainty.

Seventh Embodiment

Now, a memory card according to a seventh embodiment of the present invention is described.

The memory card of the seventh embodiment is a modification to but is different from the memory card of the sixth embodiment in that, while the projection 29 in the sixth embodiment is retracted with respect to the first case 22 by the interlocking mechanism, the projection 29 is retracted by a user.

Referring to FIGS. 20, 21(A) and 21(B) and 24, the memory card 20 includes, similarly as in the memory card of the first embodiment, a first case 22, an electronic part not shown accommodated in the first case 22, and a connector 26 provided at a leading or front end (one or first end in the longitudinal direction) of the first case 22.

Figure 22:
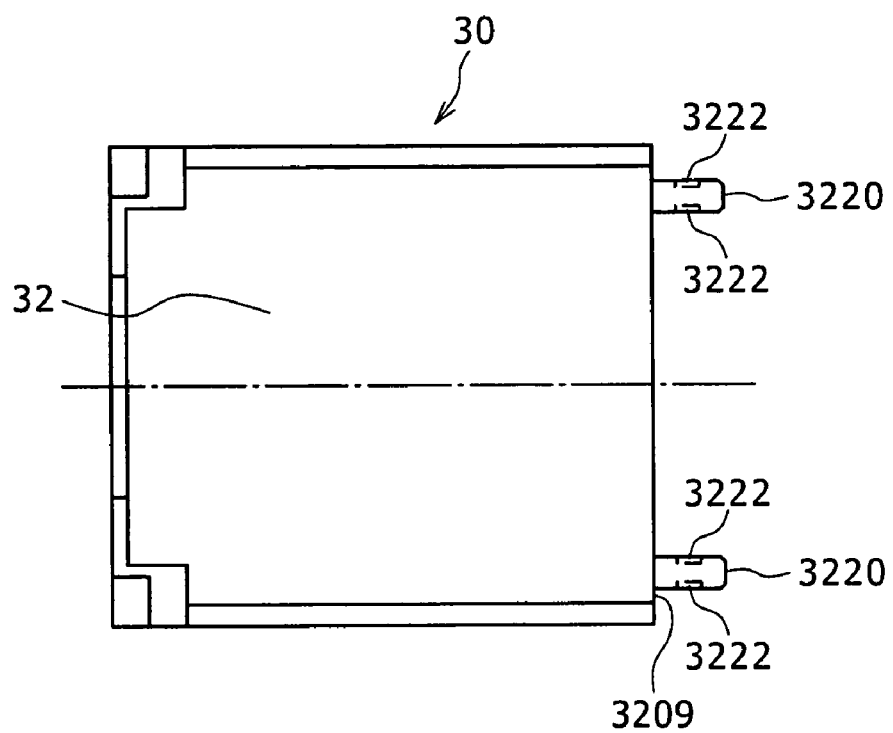
FIG. 22 is a top plan view of an attachment of the seventh embodiment.
Figure 24:
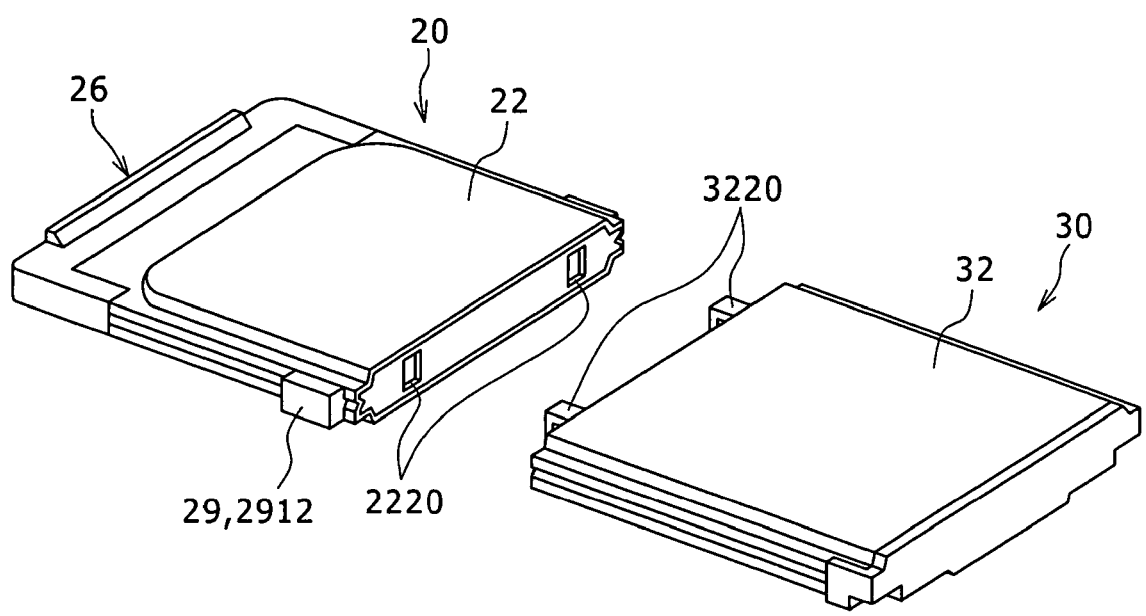
FIG. 24 is a perspective view of the memory card of FIG. 20 and the attachment of FIG. 22.

Referring to FIGS. 22 and 24, the attachment 30 includes a second case 32 having a length. The second case 32 has a width and a thickness of dimensions equal to those of the width and the thickness of the first case 22.

Similarly as in the memory card of the first embodiment, the length of the second case 32 is determined depending upon the length of the first case 22 as seen in FIGS. 2A, 2B and 2C. The first case 22 and the second case 32 are configured such that the length of the first case 22 and the second case 32 in a state wherein they are attached to each other has a dimension equal to that of the length of the Express Card 10.

Mounting portions to which the first case 22 and the second case 32 are removably attached are provided at a trailing or rear end (the other or second end in the lengthwise direction) of the first case 22 and the front end (first end in the lengthwise direction) of the second case 32 in a state wherein the lengthwise directions thereof are juxtaposed with each other. Similarly as in the memory card of the first embodiment, the mounting portions are configured such that the first case 22 and the second case 32 are removably attached thereto in a state wherein they are coincident with each other in the widthwise and thicknesswise directions.

Referring to FIG. 22, the mounting portion of the second case 32 includes a pair of engaging convex portions 3220 which project in the lengthwise direction from an end face 3209 in the lengthwise direction of the second case 32 and a pair of locking concave portions 3222 provided on each of the engaging convex portions 3220.

The engaging convex portions 3220 are provided in a spaced relationship from each other in the widthwise direction of the second case 32 and each formed in a shape of a rectangular prism having a length, a width and a thickness along the lengthwise, widthwise and thicknesswise directions of the second case 32, respectively.

The locking concave portions 3222 are provided on the opposite side faces in the widthwise direction of the engaging convex portions 3220. Consequently, totaling four locking concave portions 3222 are provided.

Figure 20:
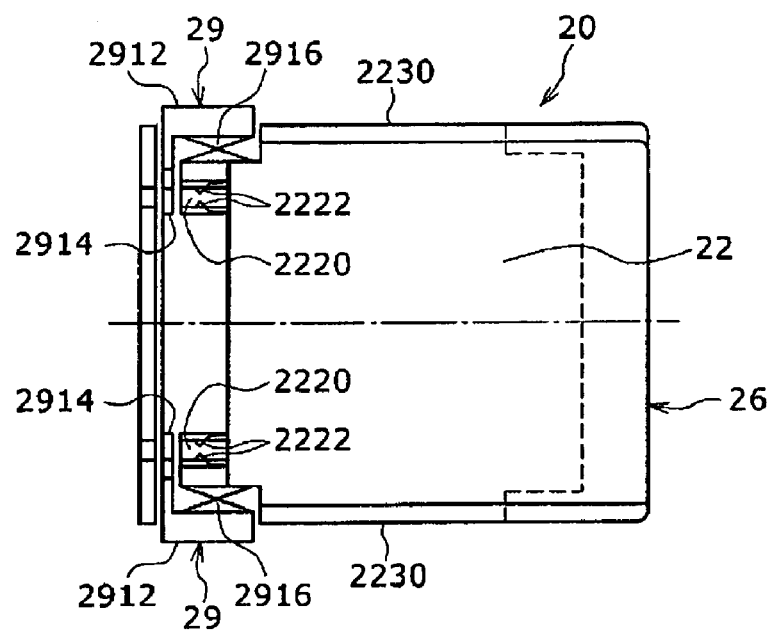
FIG. 20 is a top plan view of a memory card of a seventh embodiment of the present invention in a state wherein a convex portion projects.
Figure 21:
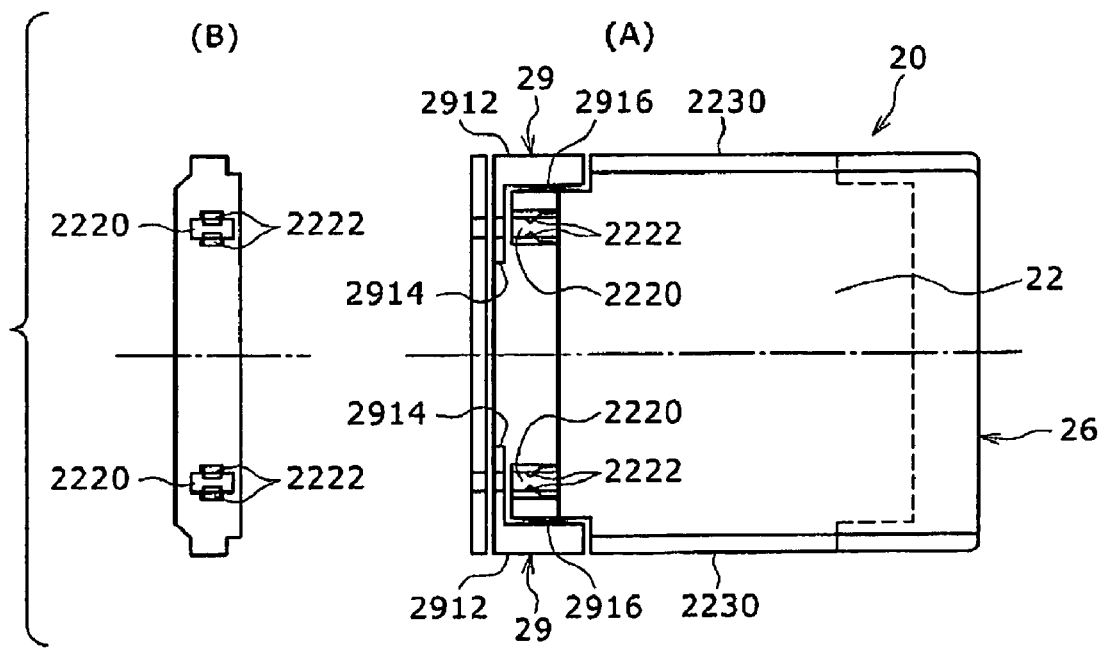
FIG. 21(A) is a top plan view of the memory card of FIG. 20 but in another state wherein the convex portion is retracted and FIG. 21(B) is a view as viewed in the direction indicated by an arrow mark B of FIG. 21(A)

Referring to FIGS. 20 and 21(A) and 21(B), the mounting portion of the first case 22 includes a pair of engaging concave portions 2220 for engaging with the engaging convex portions 3220, and a pair of holding springs 2222 provided in each of the engaging concave portions 2220. The two engaging concave portions 2220 are provided in a spaced relationship from each other in the widthwise direction of the first case 22. The totaling four holding springs 2222 are provided on the opposite sides in the widthwise direction of the first case 22 in the engaging concave portions 2220. Each of the holding springs 2222 is provided for resilient deformation in the widthwise direction such that it can be removably engaged with a corresponding one of the locking concave portions 3222 of the engaging convex portions 2220 inserted in the engaging concave portions 2220.

As the holding springs 2222 of the first case 22 are lockably engaged with the locking concave portions 3222 of the second case 32 while the engaging convex portions 3220 of the second case 32 are inserted in the engaging concave portions 2220 of the first case 22, the first case 22 and the second case 32 are coupled integrally to each other.

The engaging convex portions 2210 and the engaging concave portions 2220 function as positioning members and positioning holes when the attachment 30 is attached to the memory card 20. In the present embodiment, a releasable locking mechanism for retaining the state wherein the engaging convex portions 3220 are fitted in the engaging concave portions 2220 to position the second case 32 with respect to the first case 22 is formed from the holding springs 2222 and the locking concave portions 3222.

When the engaging convex portions 3220 of the second case 32 are inserted into the engaging concave portions 2220 of the first case 22, the holding springs 2222 of the first case 22 are lockably engaged with the locking concave portions 3222 of the second case 32 to couple the first case 22 and the second case 32 integrally to each other. In other words, the attachment 30 to the memory card 20 can be connected by a simple operation of merely inserting the engaging convex portions 3220 of the attachment 30 into the engaging concave portions 2220 of the memory card 20.

The outer profile of the first case 22 and the second case 32 in a state wherein the first case 22 and the second case 32 are coupled integrally to each other is same as that of the Express Card 10.

Cancellation of the coupling between the first case 22 and the second case 32 is performed by pulling the first case 22 and the second case 32 in directions away from each other along the lengthwise direction to cancel the lockable engagement between the holding springs 2222 and the locking concave portions 3222. It is to be noted that the locking engagement between the holding springs 2222 and the locking concave portions 3222 is canceled if force higher than the force necessary to release, in a state wherein the connector 26 and a connector for the Express Card are attached to each other, the connection between the connectors is applied.

A pair of projections 29 are disposed at a rear end of the first case 22 such that they can be retracted from side faces 2230 positioned at end portions in the widthwise direction of the first case 22.

Referring to FIGS. 20 and 21(A) and 21(B), each of the projections 29 includes a projection body 2912 disposed in an opening 2232 formed in each side face 2230 of the first case 22, and an opening/closing plate 2914 connected to the projection, body 2912 for opening and closing a place of the engaging concave portion 2220 in the proximity of the opening 2232.

Figure 23A:
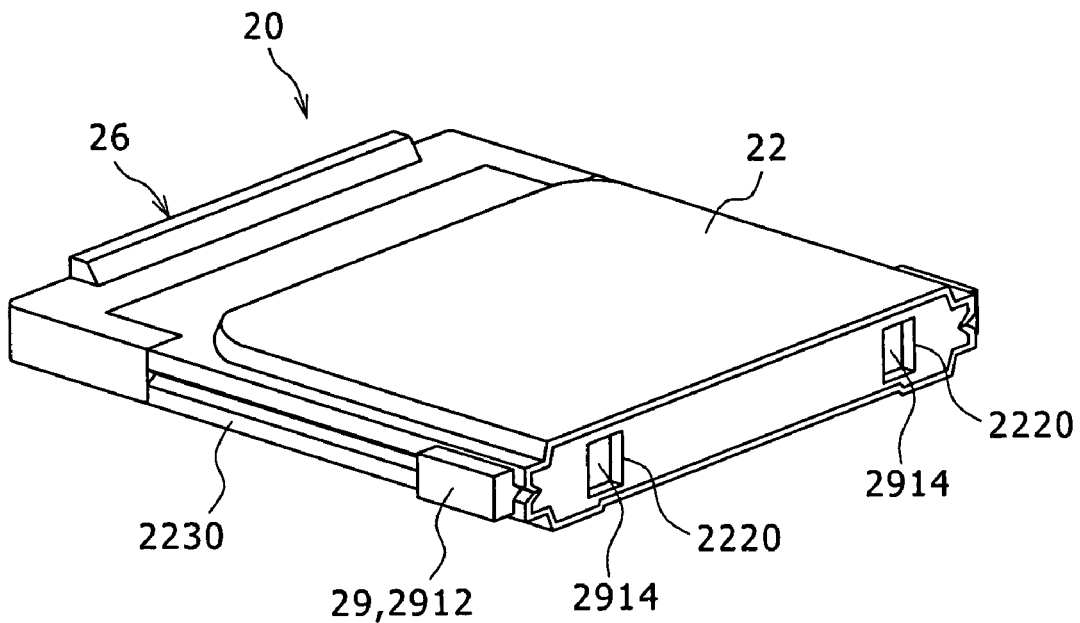
FIG. 23A is a perspective view of the memory card of FIG. 20 in a state wherein the convex portion projects and FIG. 23B is a perspective view of the memory card of FIG. 21 in another state wherein the convex portion is retracted.
Figure 23B:
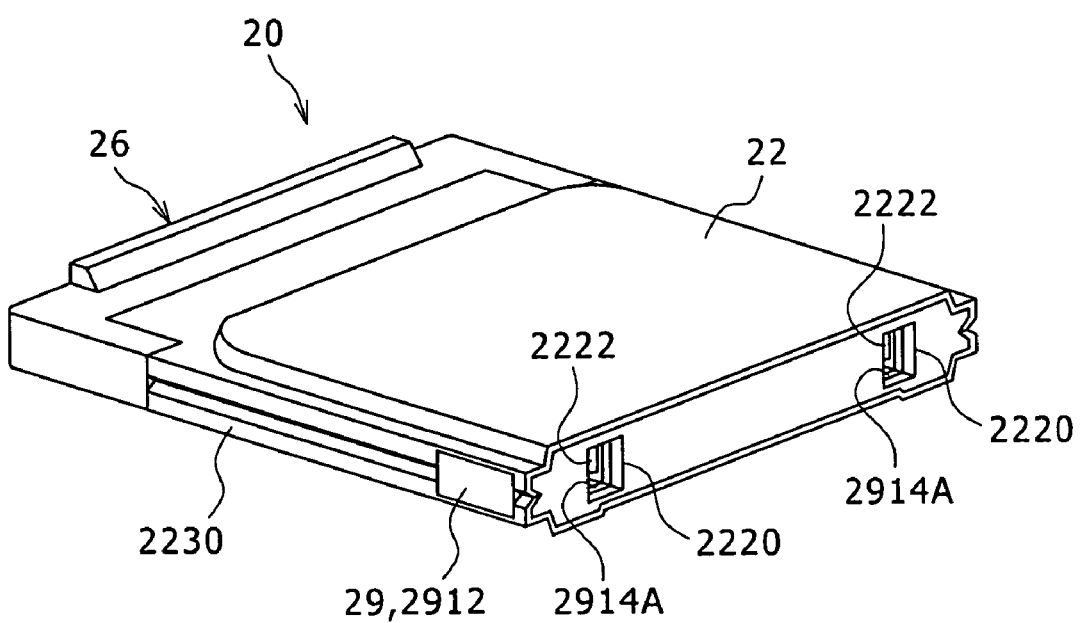

The opening/closing plate 2914 has a hole 2914A formed therein and having a contour same as that of the engaging concave portion 2220 as seen in FIG. 23B.

A leaf spring 2916 is provided between the projection body 2912 and the first case 22 for normally biasing the projection body 2912 in a direction in which it projects outwardly of the side face 2230.

The projection 29 is abutted with a stopper not shown under the biasing force of the leaf spring 2916 so that the projection body 2912 is positioned at its projecting position at which it projects from the side face 2230 of the first case 22 as seen in FIGS. 20 and 23A. In this state, the opening/closing plate 2914 extends into the engaging concave portion 2220 to close up the engaging concave portion 2220.

On the other hand, when the projection body 2912 of the projection 29 is pushed into the opening 2232 against the biasing force of the leaf spring 2916 as seen in FIGS. 21(A), 21(B) and 23B, the projection body 2912 is positioned on the same plane as the side face 2230 of the first case 22 or is placed into a retracted position in which it is positioned on the inner side in the widthwise direction with respect to the side face 2230. In this state, the hole 2914A of the opening/closing plate 2914 and the engaging concave portion 2220 are aligned with each other to open the engaging concave portion 2220.

Accordingly, in order to attach the second case 32 to the first case 22, the user would push the projection bodies 2912 into the inner side in the widthwise direction of the first case 22 to position the projections 29 at the retracted position thereby to open the engaging concave portions 2220.

In this state, the engaging convex portions 3220 of the attachment 30 are inserted into the engaging concave portions 2220 of the memory card 20 through the holes 2914A of the opening/closing plates 2914. Consequently, the holding springs 2222 are lockably engaged with the locking concave portions 3222 to couple the second case 32 to the first case 22.

Then, if the operator releases the projection bodies 2912, then although the projections 29 are biased toward the projecting position under the biasing force of the leaf springs 2916, since edge portions of the holes 2914A of the opening/closing plate 2914 are abutted by the locking convex portions 3222, the projections 29 are retained at the retracted position.

In order to cancel the coupling between the first case 22 and the second case 32, the first case 22 and the second case 32 are pulled in the directions in which they are spaced away from each other along the lengthwise direction to pull off the engaging projections 3220 from the engaging concave portions 2220. After the engaging projections removed from the engaging concave portions 2220, the projections 29 are moved to the projecting position by the biasing force of the leaf springs 2916.

According to the memory card 20 having such a configuration as described above, it naturally exhibits operation and effects similar to those of the memory card of the first embodiment. Besides, in the state wherein the attachment 30 is not attached to the memory card 20, since the projections 29 project outwardly from the side faces 2230, even if the memory card 20 by itself is fitted into a slot for exclusive use for the Express Card, the projections 29 which are positioned on the outer sides of edge portions of the slot are lockably engaged with the edge portions of the slot. Consequently, such a disadvantage that the memory card 20 drops to the inner side of the slot for exclusive use and cannot be taken out can be prevented with certainty.

Further, when the attachment 30 is not used, since the engaging concave portions are closed up with the opening and closing plates, admission of dust into the engaging concave portions can be prevented advantageously.

Eighth Embodiment

Now, a memory card according to an eighth embodiment of the present invention is described.

The memory card of the eight embodiment is similar in configuration to the memory cards of the first to seventh embodiments described hereinabove but is different only in that, while the memory card 20 according to any of the first to seventh embodiments is configured such that the attachment 30 can be attached thereto, the memory card 20 in the present eighth embodiment is used without attaching the attachment 30 thereto.

Figure 25A:
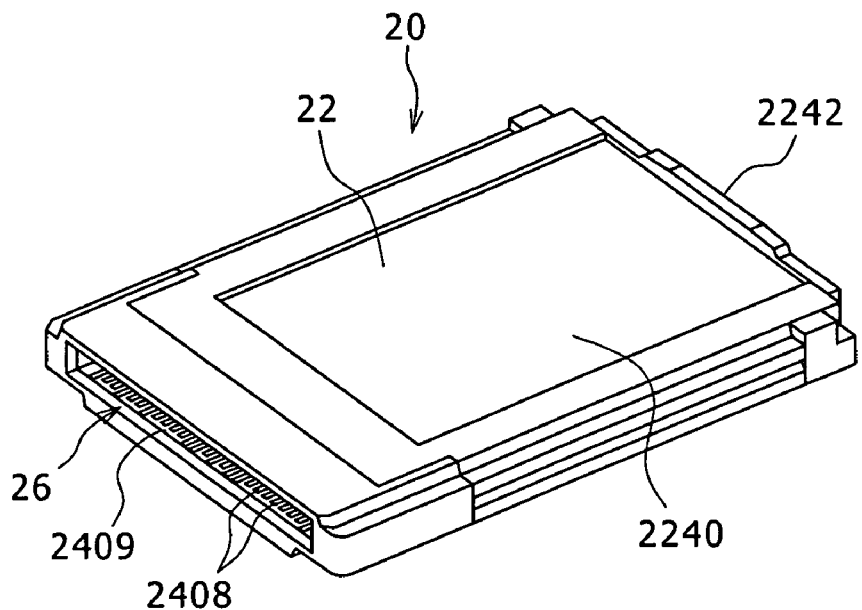
FIGS. 25A and 25B are perspective views of a memory card according to an eighth embodiment of the present invention.
Figure 25B:
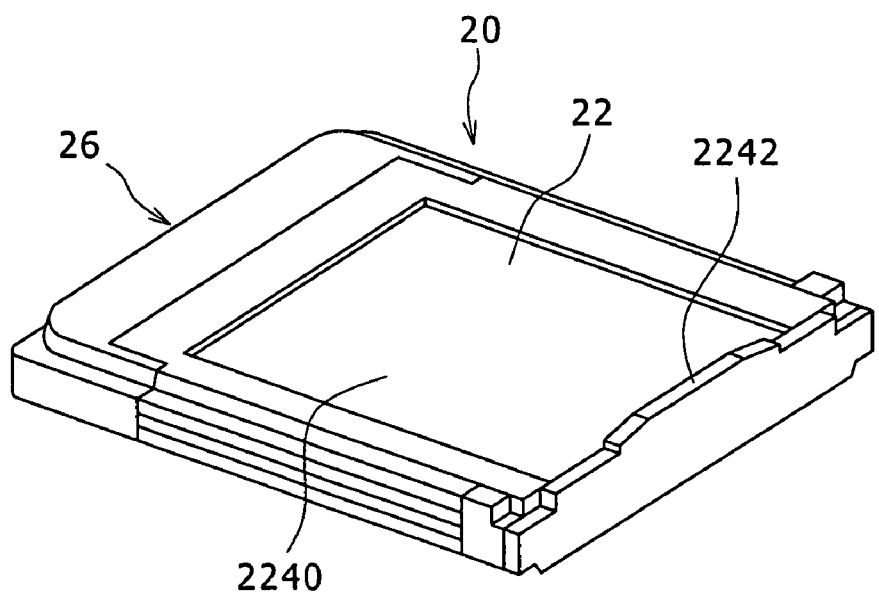

Referring to FIGS. 25A and 25B, the memory card 20 includes, similarly as in the memory card of the first embodiment, a first case 22, an electronic part not shown accommodated in the first case 22, and a connector 26 provided at a leading or front end (one or first end in the longitudinal direction) of the first case 22.

The length of the first case 22 is smaller than that of the Express Card 10 as seen in FIGS. 2A, 2B and 2C similarly as in the memory card of the first embodiment.

A projection 2242 is formed at a trailing or rear end (the other or second end in the lengthwise direction) of the first case 22 such that it projects upwardly farther than an upper face (surface) 2240 of the first case 22.

The projection 2242 is formed at a central portion in the widthwise direction and extends in the widthwise direction.

According to the memory card 20 having such a configuration as described, it can be attached by itself to a slot provided in an electronic apparatus of a small size such as a portable telephone set when it is to be used.

Further, even if the memory card 20 by itself is fitted into a slot for exclusive use for the Express Card, since the projection 2242 is positioned on the outer side of an edge portion of the slot, it is lockably engaged with the edge portion of the slot. Consequently, such a disadvantage that the memory card 20 drops to the inner side of the slot for exclusive use and cannot be taken out can be prevented with certainty.

It is to be noted that, while, in the memory card of the eighth embodiment, the projection 2242 is provided such that it projects upwardly from the upper face 2240 of the first case 22, it may otherwise be provided such that it projects downwardly from the lower face of the first case 22 or such that it project outwardly in the widthwise direction from each of the opposite left and right side faces of the first case 22.

It is to be noted that, while, in the embodiments described above, the card type peripheral apparatus is a memory card 20, the present invention is not limited to the case wherein the card type peripheral apparatus forms a memory card, but can be applied widely to various memory card which construct a hard disk apparatus, a radio communication apparatus or various interface apparatus.

Further, the structure for positioning the attachment 30 with respect to the memory card 20 is not limited to such an engaging convex portion and an engaging concave portion as in the embodiments described hereinabove, but various known configurations can be adopted for the structure.

Further, the structure of the releasable locking mechanism is not limited to a configuration which is formed from a locking pawl and a locking concave portion or a holding spring and a locking concave portion, but various known configurations can be adopted.

Further, the shape of the second case 32 of the attachment 30 is not limited to such a shape which has a width or a thickness equal to that of the first case 22 as in the embodiments described hereinabove, but, for example, the second case 32 may have a width smaller than that of the first case 22 or may have a thickness smaller than that of the first case 22. In short, the shape of the second case 32 may be any shape with which the memory card 20 to which the attachment 30 is attached can be attached to and removed from a slot having a depth of a dimension greater than the length of the first case 22 such as a slot for exclusive use for the Express Card.

While preferred embodiments of the present invention have been described using specific terms, such description is for illustrative purpose only, and it is to be understood that changes and variations may be made without departing from the spirit or scope of the following claims.

What is claimed is:

1. A card type peripheral apparatus, comprising:
   a first case;
   an electronic part accommodated in said first case, the first case being comprised of an upper case portion and a lower case portion, each of which are secured to a front cap and a rear cap, and wherein the entire electronic part is completely contained within a cavity defined by the upper and lower case and front and rear caps;
   a connector provided at a first end in a lengthwise direction of said first case for electrically connecting the electronic part to another device;
   and a second case;
   said first case having a first main body portion and, at a second end thereof in the lengthwise direction opposite to the first end, a first mounting portion to which the second case can be removably attached, the first mounting portion being located at one of the front and rear caps;

said second case having a second main body portion and a second mounting portion for interfacing with the first mounting portion of the first case, said second mounting portion provided at a first end in a lengthwise direction of the second case, wherein the first main body portion of the first case and the second main body portion of the second case have a substantially equal width and height; and wherein said first case is attachable to said second case via said first and second mounting means, and wherein neither said first mounting means nor said second mounting means include functioning electronic contacts.

2. The card type peripheral apparatus according to claim 1, wherein said first mounting portion of the first case has a projection disposed at a surface thereof in the widthwise direction of said first case, and further comprising an interlocking mechanism connected to said projection for causing said projection to be retracted into the inside of said first case from the surface when the second case is attached to said mounting portion of the first case.

3. A card type peripheral apparatus, comprising:

a first case having a length;

an electronic part accommodated in said first case, the first case being comprised of an upper case portion and a lower case portion, each of which are secured to a front cap and a rear cap, and wherein the entire electronic part is completely contained within a cavity defined by the upper and lower case and front and rear caps;

a connector provided at a first end in a lengthwise direction of said first case for electrically connecting the electronic part to a host apparatus; and a second case having a length;

said first case having a main body portion and a convex mounting portion provided at a second end thereof opposite to the first end while said second case has a main body portion and a concave mounting portion provided at a first end thereof in the lengthwise direction such that said first and second cases can be removably attached via said first and second mounting portions in a state wherein the lengthwise directions of said first and second cases are juxtaposed with each other, the convex mounting portion being located at one of the front and rear caps, and wherein the first main body portion of the first case and the second main body portion of the second case have a substantially equal width and height.

4. The card type peripheral apparatus according to claim 3, wherein said convex mounting portion of the first case has a projection disposed at a surface thereof in the widthwise direction of said first case, and further comprising an interlocking mechanism connected to said projection for causing said projection to be retracted into the inside of said first case from the surface when the second case is attached to said convex mounting portion of the first case.

5. The card type peripheral apparatus according to claim 4, wherein said convex mounting portion of said first case includes locking concave portions provided on the surface of said convex mounting portion and said concave mounting portion of said second case includes locking convex portions formed at corresponding locations of said concave mounting portion for interfacing with the locking concave portions on the surface of said convex mounting portion of the first case.

6. The card type peripheral apparatus according to claim 5, wherein said locking concave portions are provided on opposite sides in the thickness direction of the first mounting portion of said first case, and said locking pawl is provided on opposite sides in the widthwise direction of the first end of said second case.

7. The card type peripheral apparatus according to claim 6, wherein said projection disposed at a surface of the convex mounting portion of the first case is provided at a central portion in the widthwise direction of said convex mounting portion and said locking concave portions are provided on either side of the projection.

8. The card type peripheral apparatus according to claim 3, wherein said convex mounting portion of said first case is narrower in the widthwise direction than the first main body of the first case and the second main body of the second case.

9. The card type peripheral apparatus according to claim 3, wherein said convex mounting portion of said first case is thinner in the thickness direction than the first main body of the first case and the second main body of the second case.

10. The card type peripheral apparatus according to claim 3, wherein said convex mounting portion of said first case is narrower in the widthwise direction than the first main body of the first case and the second main body of the second case, and the convex mounting portion of said first case is thinner in the thickness direction than the first main body of the first case and the second main body of the second case.

11. A card type peripheral apparatus, comprising:

a first case having a width, a length, and a thickness, and being comprised of a first main body portion and a first mounting portion;

an electronic part accommodated in said first case, the first case being comprised of an upper case portion and a lower case portion, each of which are secured to a front cap and a rear cap, and wherein the entire electronic part is completely contained within a cavity defined by the upper and lower case and front and rear caps; and a connector provided at a first end in a lengthwise direction of said first case for electrically connecting the electronic part to another device;

said first mounting portion comprising a convex projection provided at a second end in a lengthwise direction thereof opposite to the first end in such a manner as to project from the surface of said first case, the first mounting portion being located at one of the front and rear caps;

wherein said projection has an outer most width and thickness less than an outermost width and thickness of the main body portion of the first case, respectively.

12. The card type peripheral apparatus according to claim 11, further comprising a second case having a second main body portion and a second mounting portion, said second mounting portion attachable to said first mounting portion, and said convex projection of said first case having a width and thickness less than the second main body portion of the second case.

13. The card type peripheral apparatus according to claim 11, wherein neither the first mounting portion of the first case nor the second mounting portion of the second case include functional electrical contacts.

14. A card type peripheral apparatus, comprising:

a first case having a width, a length, and a thickness;

an electronic part accommodated in said first case, the first case being comprised of an upper case portion and a lower case portion, each of which are secured to a front cap and a rear cap, and wherein the entire electronic part is completely contained within a cavity defined by the upper and lower case and front and rear caps; and a connector provided at a first end in a lengthwise direction of said first case for electrically connecting the electronic part to another device;

said first case having a recess provided at a second end in a lengthwise direction thereof opposite to the first end capable of receiving and retaining a projection provided on a second case, wherein said first case is attachable to a second case via said first mounting means, and wherein said first mounting means does not include functioning electronic contacts the first mounting means being located at one of the front and rear caps.

* * * * *